US009635063B2

(12) United States Patent
Hlibiciuc et al.

(10) Patent No.: US 9,635,063 B2
(45) Date of Patent: *Apr. 25, 2017

(54) NETWORK NODE AND METHOD OF ROUTING MESSAGES IN AN IP-BASED SIGNALING NETWORK

(71) Applicant: Telefonaktiebolaget L M Ericsson (publ), Stockholm (SE)

(72) Inventors: Alexandru Hlibiciuc, Aachen (DE); Robert Schnell, Aachen (DE); Bernardin Drenski, Zagreb (HR)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 376 days.

This patent is subject to a terminal disclaimer.

(21) Appl. No.: 14/086,709

(22) Filed: Nov. 21, 2013

(65) Prior Publication Data

US 2014/0153563 A1 Jun. 5, 2014

Related U.S. Application Data

(63) Continuation of application No. 12/937,788, filed as application No. PCT/EP2008/009722 on Nov. 17, 2008, now Pat. No. 8,621,103.

(Continued)

(51) Int. Cl.
*H04L 12/66* (2006.01)
*H04L 29/06* (2006.01)
(Continued)

(52) U.S. Cl.
CPC ........ *H04L 65/104* (2013.01); *H04M 7/0093* (2013.01); *H04Q 3/0025* (2013.01); *H04L 65/608* (2013.01)

(58) Field of Classification Search
None
See application file for complete search history.

(56) References Cited

U.S. PATENT DOCUMENTS 7,006,433 B1 2/2006 Dantu et al.
7,050,456 B1 * 5/2006 Sprague ................ H04L 29/06
370/392

(Continued)

FOREIGN PATENT DOCUMENTS

EP 1619845 A1 1/2006
EP 1708459 A1 10/2006
WO 2006058554 A1 6/2006

OTHER PUBLICATIONS

Loughney, J. et al., "Signalling Connection Control Part User Adaptation Layer (SUA)", Network Working Group, Request for Comments: 3868, Category: Standards Track, Oct. 2004.

(Continued)

Primary Examiner — Chi H Pham
Assistant Examiner — Fahmida Chowdhury
(74) Attorney, Agent, or Firm — Coats & Bennett, PLLC

(57) ABSTRACT

A method of routing messages in an IP-based signaling network is provided. Further, a network node for performing such a routing of messages in an IP-based signaling network is provided. The network node comprises at least two interfaces and a processing unit configured to route an incoming message received at a first of the at least two interfaces to a second interface of the at least two interfaces. Further, a relay network comprising plural of such network nodes as relay nodes is provided.

34 Claims, 13 Drawing Sheets

Related U.S. Application Data

(60) Provisional application No. 61/047,035, filed on Apr. 22, 2008.

(51) Int. Cl.
*H04M 7/00* (2006.01)
*H04Q 3/00* (2006.01)

(56) References Cited

U.S. PATENT DOCUMENTS

| | | | |
|---|---|---|---|
| 2005/0232407 A1 | 10/2005 | Craig et al. | |
| 2006/0023728 A1* | 2/2006 | Desiderio | H04M 7/0093 370/401 |
| 2006/0098628 A1* | 5/2006 | Bouckaert | H04Q 3/0025 370/352 |
| 2006/0234733 A1* | 10/2006 | Wassifi | H04M 7/066 455/466 |
| 2007/0014287 A1* | 1/2007 | Bouckaert | H04M 3/46 370/389 |

OTHER PUBLICATIONS

European Telecommunications Standards Institute, "Universal Mobile Telecommunications System (UMTS); Feasibility study on SS7 signalling transportation in the core network with SCCP-User Adaptation (SUA) (3GPP TR 29.903 version 6.0.0 Release 6)", Dec. 2004, ETSI TR 129 903, V6.0.0.

Morneault, K. et al., "Signaling System 7 (SS7) Message Transfer Part 3 (MTP3)—User Adaptation Layer (M3UA)", Network Working Group, Request for Comments: 4666, Obsoletes: 3332, Category: Standards Track, Sep. 2006, pp. 1-116, The Internet Society.

Loughney, J. et al., "Signalling Connection Control Part User Adaptation Layer (SUA)". Network Working Group, Request for Comments: 3868, Category: Standards Track, Oct. 2004, pp. 1-123, The Internet Society.

Ong, L. et al., "Framework Architecture for Signaling Transport", Network Working Group, Request for Comments: 2719, Category: Informational, Oct. 1999, pp. 1-23, The Internet Society.

Coene, L. et al., "Telephony Signalling Transport over Stream Control Transmission Protocol (SCTP) Applicability Statement", Network Working Group, Request for Comments: 4166, Category: Informational, Feb. 2006, pp. 1-22, The Internet Society.

Coene, L., et al., "SUA Implementor's guide", Signalling Transport Working group, Internet-Draft Siemens, Intended status: Informational, Nov. 10, 2006, pp. 1-38, The Internet Society.

Asveren, T., et al., "M3UA SG-SG Communication", Network Working Group, Internet-Draft, Nov. 30, 2005, pp. 1-20, The Internet Society.

Asveren, T., et al., "M3UA IPSP Procedures", Network Working Group, Internet-Draft, Dec. 20, 2005, pp. 1-14, The Internet Society.

Bidulock, B., "Load Selection (LOADSEL) for Signalling User Adaptation Layers", Network Working Group, Internet-Draft, Oct. 16, 2005, pp. 1-44, The Internet Society.

Bidulock, B., "Load Grouping Extension for Signalling User Adaptation Layers", Network Working Group, Internet-Draft, Oct. 16, 2005.

3rd Generation Partnership Project, "Technical Specification Group Radio Access Network; IP transport in UTRAN (Release 5)", 3GPP TR 25.933 V5.4.0, Dec. 2003, pp. 1-138.

European Telecommunications Standards Institute, "Services and Protocols for Advanced Networks (SPAN); MTP/SCCP/SSCOP and SIGTRAN (Transport of SS7 overIP); Signalling connection control part User Adaptation layer (SUA) [Endorsement if SIGNTRAN-SUA-14 (Dec. 2002), modified]", ETSI TS 102 143 V1.1.1, May 2003, pp. 1-23.

\* cited by examiner

| New status of M3UA Destination | Type of notified M3UA peer | M3UA Role of SPX | M3UA Message sent | Invoked M3UA procedure |
|---|---|---|---|---|
| Accessible | ASP | SGP | DAVA | SSNM |
| | SGP | ASP | ASPAC | ASPTM |
| | IPSP | IPSP | ASPAC | ASPTM |
| Inaccessible | ASP | SGP | DUNA | SSNM |
| | SGP | ASP | ASPIA | ASPTM |
| | IPSP | IPSP | ASPIA | ASPTM |
| Congested | Any | Any | SCON | SSNM |

FIG. 10

NETWORK NODE AND METHOD OF ROUTING MESSAGES IN AN IP-BASED SIGNALING NETWORK

RELATED APPLICATIONS

The present application is a continuation of U.S. patent application Ser. No. 12/937,788, which was filed on Dec. 13, 2010, which is a national stage application of PCT/EP2008/009722, filed Nov. 17, 2008, and claims benefit of U.S. Provisional Application 61/047,035, filed Apr. 22, 2008, the disclosures of each of which are incorporated herein by reference in their entirety.

TECHNICAL FIELD

The present invention relates to a method of routing messages in an IP-based signaling network and to a network node for routing messages in such a network. The invention further relates to a relay network using such a network node as a relay node.

BACKGROUND

Modern public-switched telephone networks (PSTN) use a signaling protocol, e.g. signaling system No. 7 (SS7) for switching of telephone calls. Signaling messages are transported in a signaling network separate from bearer channels. To enable the transport of SS7 signaling over an internet protocol (IP) based network, the SIGTRAN working group of the internet engineering taskforce (IETF) has defined a set of SIGTRAN protocols. Examples of such protocols are the message transfer part 3 (MTP3) user adaptation (M3UA) protocol or the signaling connection control part (SCCP) user adaptation (SUA) protocol. An interworking between SS7 protocols and user adaptation protocols is performed at a signaling gateway, which generally terminates underlying protocol layers both on the SS7 and the IP side.

There are generally three types of signaling processes defined in SIGTRAN that can use a user adaptation protocol for a transport of signaling messages. These processes are a signaling gateway process (SGP), an application server process (ASP) and an internet protocol server process (IPSP). For a communication between these processes, three different types of interfaces are defined: a SGP to ASP interface, an ASP to SGP interface and an IPSP to IPSP interface. The interfaces are incompatible, as e.g. only certain types of messages are allowed to be sent via a particular interface. The SIGTRAN protocols thus define interfaces which depend on the type of communication process and which are asymmetrical, i.e. for which the direction of communication matters. Details on such protocols can be found in RFC 3868 for the SUA protocol and RFC 4666 for the M3UA protocol.

Accordingly, two SGPs of two different SIGTRAN signaling gateways (SGs) cannot communicate with each other using standard SIGTRAN interfaces. For a communication they need to additionally emulate an ASP role or an IPSP role. Accordingly, they need to be provided with additional resources for enabling such a communication. Similarly, it is not possible for two network nodes comprising ASPs that serve two different application servers to communicate with each other using standard SIGTRAN interfaces unless they additionally implement either a SGP role or an IPSP role. Accordingly, the communication capabilities via the interfaces defined in the SIGTRAN standard are rather limited and may only be improved by providing an additional functionality in the SIGTRAN network nodes. Yet signaling gateways and application servers are often not provided with such an additional functionality, thus preventing certain types of communication.

In the SS7 network several functions are centralized at signaling transfer points (STPs). When migrating to an IP-based network, such centralized functions may be placed in a SIGTRAN signaling gateway. Yet in an all-IP network there is generally no need for a SIGTRAN signaling gateway. The SIGTRAN standards do not define any network nodes capable of performing these centralized functions.

Further, network and traffic management/maintenance functions and procedures are not defined in the SIGTRAN protocols that would enable a simple relay of SS7 signaling in an IP-based network, unless a change of a SIGTRAN adaptation layer protocol is performed at relay. A change of a SIGTRAN adaptation layer at a relay may further have negative consequences due to interactions between layers. For example, a change from M3UA to a message transfer part 2 (MTP2) user peer-to-peer adaptation (M2PA) layer may lead to a negative interaction between MTP3 carried over M2PA and M3UA, which may influence a quality of service provided by M3UA to its users.

Although the SUA standard RFC 3868 mentions a relay functionality, it does not mention how such a functionality may be achieved. A relay functionality is further known from a signaling gateway (SG), which routes messages between the SS7 and the IP network. Yet the SG needs to implement a SS7 layer stack and performs an interworking with the user adaptation layer. A relay is thus only possible at an expense of additional SS7 layers which have to be provided and maintained in the SG. Such a relay functionality again excludes a communication between certain types of signaling processes. An interoperability of the signaling processes cannot be achieved by one of the above-mentioned relay functionalities. A number of possible communication scenarios are thus excluded with such a relay functionality. Without a relay function it is not possible to realize a hierarchical SIGTRAN network architecture based on existing SIGTRAN user adaptation layers. Approaches relying on a change of the adaptation layer at relay complicate the node configuration, network maintenance and increase operational expenditure.

Accordingly, there is a need to overcome or at least mitigate the above-mentioned drawbacks. In particular, there is a need to achieve an improved transport of messages in an IP-based signaling network and to enable a communication between different types of signaling processes over such a network. It is further desirable to achieve such an improved transport of messages without the need to implement SS7 protocol layers in the network nodes of the IP-based signaling network, and accordingly to reduce necessary network maintenance and operational expenditure. Further, there is a need to provide a network entity in an IP-based signaling network capable of performing centralized functions.

SUMMARY

This need is met by a network node and a method according to the independent claims. The dependent claims describe embodiments of the invention.

The present invention provides a network node and a method for routing messages in an IP-based signaling network.

According to a first aspect of the invention, a method of routing messages in an IP-based signaling network using a network node comprising at least two interfaces each towards a remote network node of the IP-based network, each remote network node implementing a remote signaling process, is provided. The method comprises routing an incoming message received at a first one of the at least two interfaces to a second interface of the at least two interfaces. The routing comprises a translating of the incoming message into a corresponding outgoing message in dependence on a type of the remote signaling process of the remote network node at the first interface and a type of the remote signaling process of the remote network node at the second interface. The first and the second interface may be the same interface or different interfaces. The network node at which the routing of the incoming message is performed may be considered a relay node. By using such a method, a communication between different types of network nodes of the signaling network is enabled. As an example, the method achieves a communication between a network node implementing a SGP and a network node implementing an IPSP, without the need for the network node comprising the SGP to take on the role of an ASP. Further, the method does not require the use of a SS7 protocol stack. Implementation costs and operational expenditure is thus reduced for the remote network nodes in the IP-based signaling network communicating via the relay node. The network node performing the routing, i.e. the relay node, can further be implemented cost efficiently. As it routes traffic in the IP-based signaling network, it is further capable of performing centralized functions.

According to an embodiment of the invention, the method further comprises a determining of the type of the remote signaling process of the remote network node at the second interface based on address-related parameters comprised in the incoming message. The remote network node towards which the outgoing message is routed may comprise plural remote signaling processes, and accordingly, the method may further comprise a selecting of a remote signaling process of the remote network node at the second interface in accordance with message parameters of the incoming messages and/or a local configuration of the relay node.

According to an embodiment of the method, the at least two interfaces comprise an interface towards a remote network node implementing an application server process, an interface towards a remote network node implementing a signaling gateway process and an interface towards a remote network node implementing an internet protocol server process.

According to an embodiment, the translating may include a transcribing of a routing context by identifying an incoming routing key (RK) associated with the incoming message based on a routing context (RC) parameter comprised in the incoming message. On the basis of the incoming routing key or on the basis of the incoming routing key in combination with address-related parameters comprised in the incoming message, an outgoing routing key is determined for the outgoing message. A routing context corresponding to the outgoing routing key is then assigned to the outgoing message. A routing key may for example identify a remote network node serving a particular traffic range. The outgoing message is sent via the interface towards the remote network node associated with the outgoing routing key. The outgoing routing key may be associated with a list of active remote signaling processes serving the remote network node. The method may further comprise a selecting of an active remote signaling process from said list and sending the outgoing message to the selected remote signaling process on a stream control transmission protocol (SCTP) association. The selecting may be performed on the basis of a load balancing method, such as round robin. Address-related parameters may comprise a service indicator (SI), a network indicator (NI), a network appearance (NA), a destination point code (DPC), an originating point code (OPC), or a signaling link selection (SLS) code.

According to another embodiment, the network node implements an internet protocol (IP) based protocol stack comprising a user adaptation layer, wherein the routing is performed by receiving the incoming message and sending the outgoing message using the same user adaptation protocol layer. Examples of a user adaptation protocol layer are a SUA layer or a M3UA layer. Routing messages in such a way has the advantage that no additional SS7 protocol layers need to be provided and that no interworking between SS7 layers and user adaptation layers needs to be performed.

The translation of the incoming message may be performed by a function implemented at said user adaptation layer. The user adaptation layer may for example be a signaling connection control part user adaptation layer or a message transfer part 3 user adaptation layer. According to an embodiment, for each of the at least two interfaces a stream control transmission protocol association may be established by a stream control transmission protocol layer of an IP based protocol stack towards the remote network node at the respective interface by using a single stream control transmission protocol endpoint for all stream control transmission protocol associations or by using a dedicated stream control transmission protocol end point for each remote signaling process of the remote network nodes at the at least two interfaces. According to an embodiment of the method, the at least two interfaces comprise an interface towards a remote network node implementing an application server process, an interface towards a remote network node implementing a signaling gateway process and an interface towards a remote network node implementing an internet protocol server process.

According to another embodiment, the method may further comprise running locally at least two local signaling processes on the network node. Each local signaling process provides at least one of the at least two interfaces. A type of the local signaling process is determined by the type of the remote signaling process of the remote network node at the interface which is provided by the local signaling process. Each local signaling process may only provide interfaces towards remote network nodes comprising the same type of remote signaling process. Such a configuration has the advantage that a remote network node may not realize that it connects to a relay node instead of connecting to another remote network node comprising a remote signaling process. Further, each remote signaling process can be provided with an appropriate interface by a local signaling process.

The interface towards the remote network node implementing an application server process may be provided by a local signaling gateway process, the interface towards a remote network node implementing an signaling gateway process may be provided by a local application server process, and the interface towards a remote network node implementing an internet protocol server process may be provided by a local internet protocol server process.

According to another embodiment, the translation comprises modifying at least one of a message parameter value, a message parameter set, an information element value, an information element set or at least one parameter selected from a group comprising a network appearance (NA), a routing context (RC), a message type, a message class, a protocol version or a message length. The modifying is performed so as to bring the outgoing message into accordance with the type of remote signaling process of the remote network node at the second interface. This has the advantage that the message can be adapted so as to conform to a message format that can be received and processed by the network node at the second interface. As SIGTRAN network nodes are only adapted to receive certain types of messages, such a translation improves the communication between different types of SIGTRAN network nodes.

As an example, the type of remote signaling process of the remote network node at one of the at least two interfaces determines message types allowed to be sent via the interface. The translation may include a modifying of a message type of the incoming message so that a message type of the outgoing message corresponds to a message type allowed to be sent via the second interface. It is thus ensured that a message can be understood by the remote network node towards which it is sent. Another example can be given for the case where the remote signaling process of the remote network node at the first interface implements a first version of the user adaptation protocol different from a second version of the user adaptation protocol implemented by the remote signaling process of the remote network node at the second interface. In such a case the translating may further comprise a removing and/or replacing of a parameter of the incoming message so as to bring the outgoing message into accordance with the second user adaptation protocol version. By performing the translation in such a way, a communication between remote network nodes implementing different user adaptation protocol versions can be achieved. This is particularly advantageous when signaling messages are routed between SIGRAN networks of different operators implementing different protocol versions.

The translating may also comprise a network address conversion between a SS7 signaling network-specific identifier and an internet protocol-specific identifier, and/or between different SS7 network-specific numbering plans. An IP-specific identifier may for example be an IP address or a host name. This is advantageous as there may be SIGTRAN signaling processes with limited addressing capabilities in the network. Further, signaling networks operated by different operators may have different numbering schemes, and accordingly, such a conversion may enable the exchange of messages between network nodes in the different SIGTRAN networks.

According to another embodiment, the method further comprises storing a state of a remote network node associated with one of said at least two interfaces and/or storing a state of a remote SS7 network node available via a signaling gateway associated with one of said at least two interfaces. By storing states, the network node, i.e. relay node, is thus enabled to notify remote network nodes of the state of another remote network node or of a SS7 network node. The state stored for a particular remote network node may be changed in accordance with a received network management message or a received traffic maintenance message. The method may further comprise providing information to a remote signaling process on a change of a stored state by sending a network management message or a traffic maintenance message to the remote signaling process via one of the at least two interfaces. The type of the network management message or the type of the traffic maintenance message sent is determined by the type of the remote signaling process towards which the respective message is sent. As an example, a destination available (DUNA) or a destination unavailable (DAVA) message may be sent to an application server process, whereas an ASP active (ASPAC) or ASP inactive (ASPIA) message may be sent to a signaling gateway process. Accordingly, an interworking of network management and traffic management procedures is achieved for different types of remote network nodes of the SIGTRAN network.

According to another embodiment of the method, the routing may further comprise the performing of a centralized function at the network node. Such a centralized function may include the encryption of user protocol data comprised in the incoming message based on information carried in the incoming message. Such information may be for example a destination address or a type of destination application. Such a centralized function may also include a performing of a policing of the incoming message when the message is to be routed to an IP-based signaling network different from the IP-based signaling network comprising the remote network node originating the message. The policing may be performed by restricting a routing of the incoming message and/or of incoming management messages in accordance with user data associated with the incoming message. Such user data may be locally stored or retrieved from a database. The centralized function may also include a performing of an application relation function such as a short message filtering, a short message screening, a SCCP message screening, a SCCP message filtering or a roaming steering. The centralized function may also comprise a converting of application data comprised in the incoming message so as to conform to an application variant supported by the remote signaling process of the remote network node at the second interface. This is beneficial in the case where different application variants are implemented at the remote signaling process originating the incoming message and the signaling process receiving the outgoing message. Performing such centralized functions at the relay node is advantageous, as they would otherwise have to be placed in each SIGTRAN end point, i.e. remote network node. Such functions may for example be centralized in a few redundant relay nodes, which can reduce operational expenditure.

According to another aspect of the invention, a network node for routing messages in an IP-based signaling network is provided. The network node comprises at least two interfaces each towards a remote network node of the IP-based network, each remote network node implementing a remote signaling process. The network node further comprises a processing unit configured to route an incoming message received at a first of the at least two interfaces to a second interface of the at least two interfaces. The routing comprises a translating of the incoming message into a corresponding outgoing message in dependence of a type of the remote signaling process of the remote network node at the first interface and a type of the remote signaling process of the remote network node at the second interface. Such a network node has the advantage that it can provide a suitable interface to different types of remote SIGTRAN network nodes. These may then communicate with each other via the network node. The network node may thus be considered to convert one type of SIGTRAN interface to another. Accordingly, the network node enables applications at different remote network nodes having incompatible interfaces to communicate with each other. A further advantage of using the network node of the invention for routing messages is that the configuration of a remote network node at one of said interfaces may be hidden from a remote network node at another interface. The network node also enables a centralizing of functions, resulting in a reduced cost for implementing these functions. The network node may be referred to as relay node. Similar advantages as outlined above with respect to the method may also be achieved with the inventive network node.

According to an embodiment, the at least two interfaces comprise an interface towards a remote network node implementing an application server process (ASP), an interface towards a remote network node implementing a signaling gateway process (SGP), and an interface towards a remote network node implementing an internet protocol server process (IPSP). Although these different remote signaling processes have different incompatible interfaces, the network node enables a communication between these different remote signaling processes or between remote signaling processes of the same type. It should be clear that the network node may also comprise plural interfaces towards a remote network node implementing a particular type of remote signaling process, and that plural remote signaling processes of the same type may be reached via one interface.

Each of the at least two interfaces may be provided by a local signaling process running locally on the processing unit. The type of the local signaling process is determined by the type of the remote signaling process of the remote network node at the interface provided by the local signaling process. The local signaling process can provide the appropriate interface for the remote network node and by implementing plural local signaling processes, a conversion between different interface types may be enabled. As an example, the interface towards the remote network node implementing an application server process may be provided by a local signaling gateway process, the interface towards a remote network node implementing a signaling gateway process may be provided by a local application server process, and the interface towards a remote network node implementing an internet protocol server process may be provided by a local internet protocol server process. Accordingly, a matching interface can be provided at the network node for each type of remote network nodes. The translation may then be performed by an interworking between the local signaling process, which may comprise an address mapping and a message type conversion, thus enabling an interoperability between the different types of remote network nodes.

According to an embodiment, the type of remote signaling process of the remote network node at one of the at least two interfaces determines message types allowed to be sent via the interface. The processing unit may be configured to perform the translating such that it includes a modifying of a message type of the incoming message so that a message type of the outgoing message corresponds to a message type allowed to be sent via the second interface.

According to yet another embodiment, the processing unit may be configured to perform the translating such that it comprises a transcribing of a routing context. The routing context may for example be transcribed by identifying an incoming routing key associated with the incoming message based on a routing context parameter comprised in the incoming message, determining an outgoing routing key for said outgoing message on the basis of the incoming routing key or on the basis of the incoming routing key in combination with address-related parameters comprised in the incoming message, and assigning a routing context corresponding to the outgoing routing key to the outgoing message.

According to another embodiment, the network node may further comprise a memory unit to store a state of at least one remote network node at one of the at least two interfaces, wherein the local signaling process providing the respective interface is configured to update the stored state in accordance with the status of the remote network node. As mentioned above, this may occur in accordance with network management or traffic maintenance messages received via the respective interface. By notifying remote network nodes on a change of the stored state, an interworking of network management and traffic maintenance procedures may be achieved.

As an example, the processing unit may be configured to change the state stored for a particular remote network node in accordance with a received network management message or a received traffic maintenance message. Further, the processing unit may be configured to provide information to a remote signaling process on a change of a stored state by sending a network management message or a traffic maintenance message to the remote signaling process via one of the at least two interfaces, wherein a type of network management message or a type of traffic maintenance message sent is determined by the type of the remote signaling process towards which the respective message is sent.

According to another embodiment, the processing unit is configured to perform the translating such that it comprises a network address conversion between a SS7 signaling network specific identifier and an internet protocol specific identifier, and/or between different SS7 network specific numbering plans.

According to yet another embodiment, the processing unit may be configured to perform the translating such that it comprises a removing and/or replacing of a parameter of the incoming message so as to bring the outgoing message into accordance with a second user adaptation protocol version if the remote signaling process of the remote network node at the first interface implements a first version of a user adaptation protocol different from the second version of the user adaptation protocol implemented by the remote signaling process of the remote network node at the second interface.

According to another embodiment, the processing unit implements an internet protocol-based protocol stack comprising a user adaptation layer. The at least two interfaces are provided at the user adaptation layer. The user adaptation layer may for example comprise functions or processes providing the at least two interfaces, such as the above-mentioned local signaling processes. As the interfaces are provided at the same user adaptation layer, no interworking between different user adaptation layers or between user adaptation and SS7 protocol layers needs to be performed. It should be clear that the IP-based protocol stack may comprise further layers, such as a stream control transmission protocol (SCTP) layer and an IP layer. Further, the processing unit may be configured to perform the translation by a function implemented at the user adaptation layer. Such a function may be an interworking function performing an interworking between two local signaling processes. The user adaptation layer may for example be a signaling connection control part (SCCP) user adaptation (SUA) layer or a message transfer part 3 (MTP3) user adaptation (M3UA) layer.

According to another embodiment, the processing unit implements an IP protocol stack comprising a SCTP layer configured to establish a SCTP association for each of the at least two interfaces towards the remote network node at the respective interface. For establishing the associations, a single SCTP endpoint may be used for all SCTP associations or a dedicated SCTP endpoint may be used for each remote signaling process of the remote network nodes at the at least two interfaces. By using a dedicated SCTP endpoint per remote signaling process, a traffic/address separation can be achieved.

According to a further aspect of the invention, a relay network using an internet protocol-based user adaptation protocol for relaying signaling messages comprising plural of the above-mentioned network nodes as relay nodes is provided. By using plural relay nodes, a hierarchical SIGTRAN network architecture can be achieved. This may for example allow a SIGTRAN signaling network to be separated into independent sub-networks. This is beneficial, as each sub-network may be configured independently. The sub-networks may be bridged by the relay nodes which may perform an interworking of network management and traffic management procedures. Parts of the configuration of a SIGTRAN network, e.g. a sub-network, may be hidden from certain SIGTRAN network nodes, for example existing signaling processes, application servers and their capabilities, traffic modes, redundancy schemes, and the like. In such a relay network, particular functions may be centralized at a few redundant relay nodes which may be geographically distributed. Accordingly, operational expenditure can be reduced.

According to an embodiment, a relay node of the relay network may be configured to detect another relay node of the relay network and to adapt its configuration to a configuration of the other relay node. The relay node may for example comprise local signaling processes which may be configured in accordance with local signaling processes provided at the other relay node. The construction of a hierarchical SIGTRAN relay network may thus be achieved, in which signaling messages can be routed from an originating network node to a destination network node via plural relay nodes. Further, at least one relay node of the relay network may implement an operation and maintenance application (OMAP) in order to detect routing problems including at least circular routing in the relay network. Other OMAP procedures may be adapted for an operation in the SIGTAN network, whereby a reliable routing of messages in the relay network is achieved.

According to another aspect of the invention, an electronically readable data carrier with stored electronically readable control information is provided. The control information is configured such that when using the data carrier in a computer system, the control information performs one of the above-described methods. The control information may also be comprised in a computer program product.

Those skilled in the art will appreciate that one or more features of the above-described aspects and embodiments of the invention may be combined. Further, one of the above-described methods may be implemented in an inventive network node, or embodiments of the method outlined above may comprise steps described with respect to the inventive network node or embodiments thereof.

The foregoing and other features and advantages of the invention will become further apparent from the following detailed description read in conjunction with the accompanying drawings. The detailed description and drawings are merely illustrative of the invention rather than limiting.

BRIEF DESCRIPTION OF THE DRAWINGS

The Embodiments of the present invention are illustrated by the accompanying figures, wherein

FIG. 10 illustrates the type of network management or traffic maintenance messages sent by a network node according to an embodiment of the invention in dependence on the type of notified peer signaling process;

DETAILED DESCRIPTION

Figure 1:
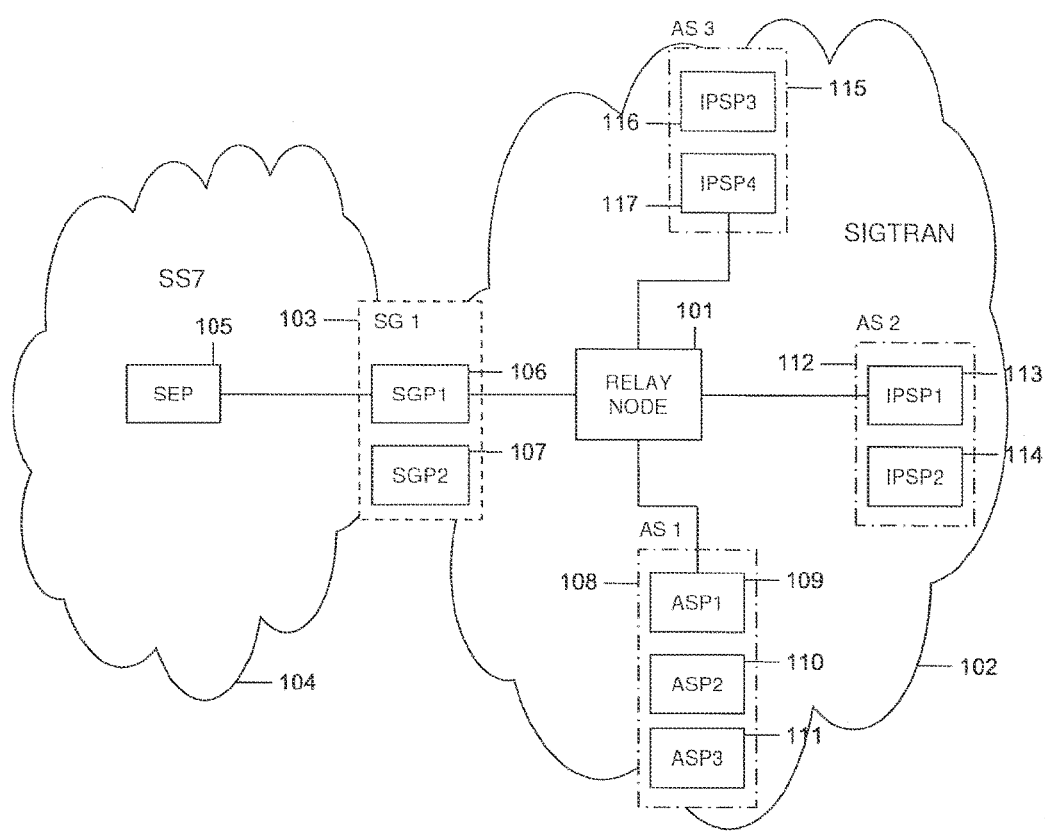
FIG. 1 shows a schematic diagram of an embodiment of a network node according to the invention being connected to different types of remote network nodes in a SIGTRAN network.

FIG. 1 shows a network node 101 for routing messages in an IP-based signaling network 102 according to an embodiment of the present invention. Network node 101 may also be referred to as relay node. The IP-based network 102 is a SIGTRAN network implementing a user adaptation layer, such as SUA or M3UA. Signaling gateway 103 enables an exchanging of messages between network nodes in the SIGTRAN network 102 and the SS7 network 104, e.g. signaling endpoint (SEP) 105. Signaling gateway (SG) 103 comprises signaling gateway processes (SGPs) 106 and 107. Relay node 101 comprises plural interfaces towards remote network nodes, in particular an interface to application server (AS) 108 implementing the remote signaling processes ASP 109, ASP 110 and ASP 111, an interface towards AS 112 implementing remote signaling processes in form of internet protocol server processes (IPSP) 113 and IPSP 114, an interface towards AS 115 implementing IPSP 116 and IPSP 117 and an interface towards SG 103 implementing SGP 106 and 107. Relay node 101 may use the same interface to communicate with different remote signaling processes of the same type, e.g. IPSP 113, 114 and 116. Relay node 101 may also provide a separate interface towards each remote network node, or towards each remote signaling process. The interfaces may be software-implemented, e.g. at the layer level of the user adaptation layer. Messages received and sent over the interfaces of relay node 101 may be transported using SCTP associations towards the remote network nodes.

As relay node 101 comprises interfaces towards different types of remote network nodes, an exchange of messages between different types of remote network nodes can be achieved even if these have incompatible interfaces, such as SGP 106 and IPSP 117. The communication is enabled as relay node 101 not only routes a message received at one of the interfaces to another interface, but also performs a translation of the message in accordance with the type of the remote signaling process at the respective interface. An incoming message received at the interface towards SGP 106 is for example translated into an outgoing message that can be understood by IPSP 117 and is sent via the interface towards IPSP 117. As another example, signaling gateway processes of different SGs may have interfaces incompatible towards each other, yet they may still communicate via relay node 101, as it performs a message translation as required.

In another example, the translation may only include a mapping of address parameters, e.g. when sending a message from SGP 106 to AS 108 via relay node 101. At relay, relay node 101 may also select the remote process of the remote network node towards which the message is addressed, e.g. based on load balancing considerations. The messages may be transported over SCTP associations which are established between relay node 101 and remote signaling processes. The remote signaling process may thus be selected by selecting the SCTP association over which the message is sent. Relay node 101 may further interwork network management and traffic maintenance procedures. Relay node 101 may for example store the state of remote SS7 destinations reachable via a signaling gateway, e.g. the state of SEP 105 reachable via SG 103 and/or a route availability of a route, to SEP 105. Further, it may store the state of remote network nodes, e.g. AS 108, 112 or 115. Concerned remote signaling processes may then be informed by network management or traffic maintenance messages on a change of a state of a remote network node. Each interface allows only certain types of messages to be sent towards the respective remote network node, and relay node 101 will send the appropriate messages in accordance with the interface type. Process management and network management messages may also be directly routed, and translated if required.

SIGTRAN network 102 may comprise plural relay nodes 101. Messages may thus be routed via plural relay nodes. This further allows a division of the SIGTRAN network into sub-networks, which may be connected via one or more relay nodes. Accordingly, a hierarchical network structure can be established with plural relay nodes according to embodiments of the present invention. In such a relay network, functions can be centralized at the relay nodes and do not need to be provided in each network node.

Figure 2:
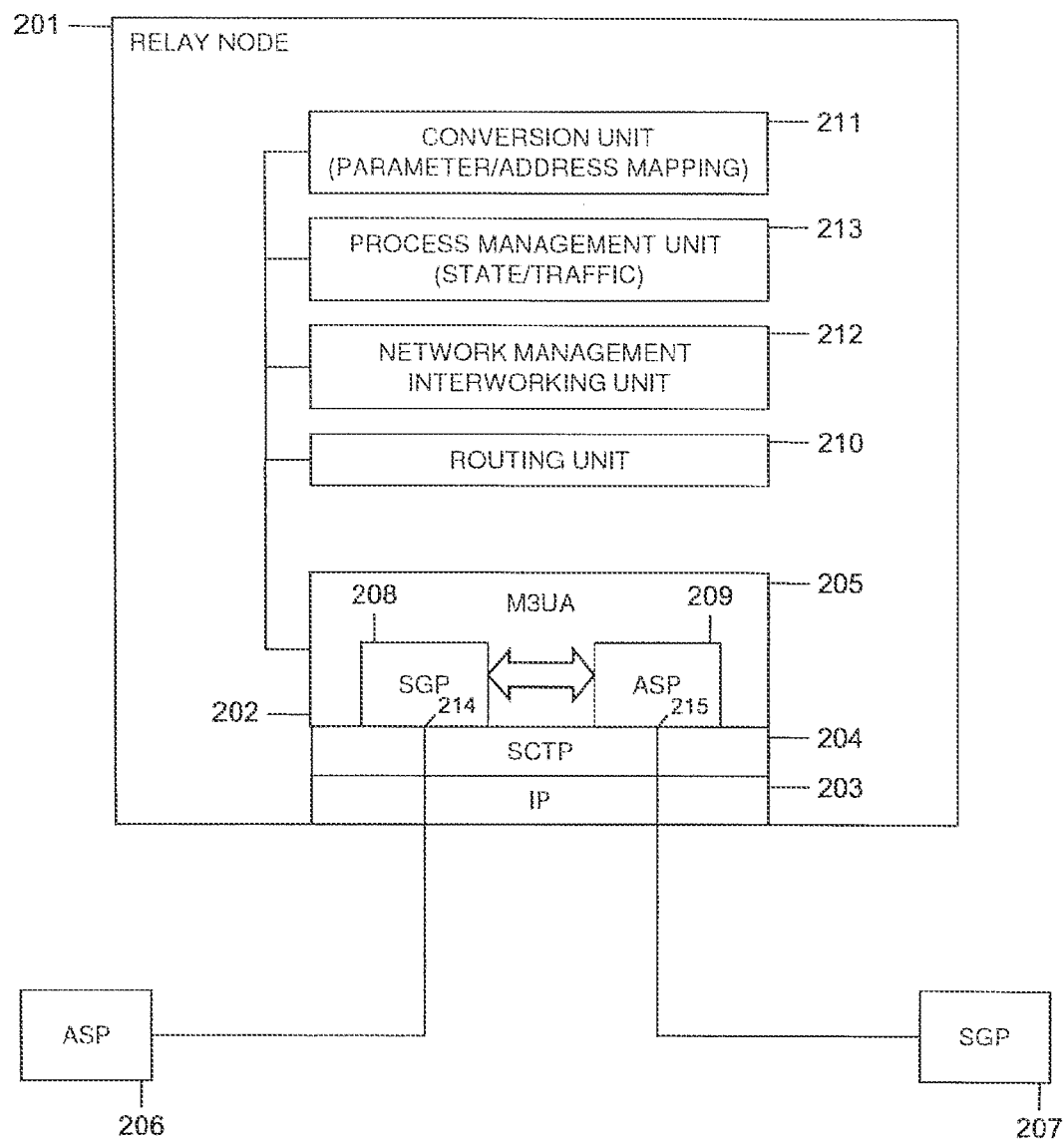
FIG. 2 is a schematic diagram illustrating functional units of a network node according to an embodiment of the invention.

FIG. 2 schematically shows functional units of a relay node 201 according to an embodiment of the invention. Relay node 201 implements an IP-based protocol stack 202 comprising an IP layer 203, an SCCP layer 204 and an M3UA layer 205. It should be understood that protocol stack 202 may comprise further layers, not shown in FIG. 2, and that it may comprise different layers in other embodiments, e.g. a SUA layer instead of the M3UA layer. In the present example, relay node 201 comprises an interface 214 towards a remote ASP 206 and an interface 215 towards a remote SGP 207. For the purpose of simplification, the remote network nodes served by the remote signaling processes 206 and 207 are not shown in FIG. 2. The interfaces 214 and 215 are provided by relay node 201 at the layer level of the M3UA layer 205. On the level of the M3UA layer 205, two local signaling processes, SGP 208 and ASP 209, are implemented, said processes running locally on relay node 201. SGP 208 provides an interface 214 compatible to ASP 206, whereas ASP 209 provides an interface 215 compatible to SGP 207. By implementing the local signaling processes 208 and 209, remote signaling processes 206 and 207 thus have the impression of communicating with another remote signaling process when really communicating with relay node 201. In the present embodiment, the local signaling processes do not implement a full IP layer stack as the remote signaling processes 206 and 207 may, but are processes running at the M3UA layer. The SCTP layer 204 establishes SCTP associations between the local signaling processes 208 and 209 and their remote peer signaling processes 206 and 207. The SCTP layer is capable of delivering an incoming message to the correct local signaling process.

In such a configuration, it is achieved that relay node 201 always provides an appropriate interface towards remote signaling processes. Routing unit 210 routes a message received at one of the interfaces to a remote network node at the same or at another interface. Routing unit 210 determines a destination remote network node based on address parameters comprised in the received incoming message, such as a routing context and a network appearance. These parameters are used by routing unit 210 to determine an outgoing routing key and e.g. an associated application server. SCTP layer 204 may have SCTP associations established towards plural ASPs serving the destination application server, and routing unit 210 may select an ASP by selecting the SCTP association over which the message will be sent. For this purpose, the routing key may comprise a list of active ASPs serving the application server. When routing the message, relay node 201 further performs a translation of the message using conversion unit 211. The translation may for example include an address mapping performed by conversion unit 211. A translation of a message may further include adapting a parameter set or a parameter, such as a message type or a protocol version, so that an incoming message received at one of the interfaces is translated into an outgoing message of a format that can be processed by the signaling process of the destination remote network node. Relay node 201 further comprises a network management interworking unit 212. Unit 212 stores the state of remote network nodes in the SS7 network and/or the state of routes towards these that can be reached via a signaling gateway at one of the interfaces provided. The remote SS7 network node may indicate its status by sending MTP3 or SCCP network management messages, which may be transcribed and routed by the signaling gateway to relay node 201. In accordance with received management messages, such as DUNA, DAVA or SCON (signaling congestion), network management interworking unit 212 updates the state stored for the concerned SS7 network node. Further, unit 212 initiates the sending of network management messages to concerned remote signaling processes, such as an ASP processing traffic for the remote SS7 network node. As relay node 201 is capable of performing a translation of the messages, it may also inform signaling processes of other types, e.g. an IPSP or SGP, even though they may not support the message type received by relay node 201. A network management interworking is thus achieved.

Process management unit 213 performs an interworking of state and traffic maintenance procedures. It routes state and traffic maintenance messages and, depending on the type of source and destination signaling processes, may adapt the message type. Unit 213 may further store the state of remote network nodes, and broadcast a change of the stored state to concerned signaling processes. It may for example indicate that an affected traffic range, e.g. a particular signaling point code (SPC) is accessible, inaccessible or congested. This may for example be achieved by sending DUNA, DAVA or SCON message on an interface towards an ASP or ASPAC or ASPIA messages on an interface towards an SGP or an IPSP. The above-mentioned types of messages are known to a person skilled in the art and will not be explained in greater detail here. Reference is made to RFC 3868 and RFC 4666, where further details can be found.

The above-mentioned functions may be implemented at the user adaptation layer, e.g. M3UA layer 205 or at a SUA layer. By using these functions, an interworking between the local signaling processes implemented at the user adaptation layer is achieved. It should be clear that the user adaptation layer may implement plural local signaling processes of the same and of different types, thus providing e.g. plural ASP, SGP and IPSP interfaces. As the translation and routing is performed at the user adaptation layer, there is no need to implement additional SS7 or legacy network layers at relay node 201.

Figure 3:
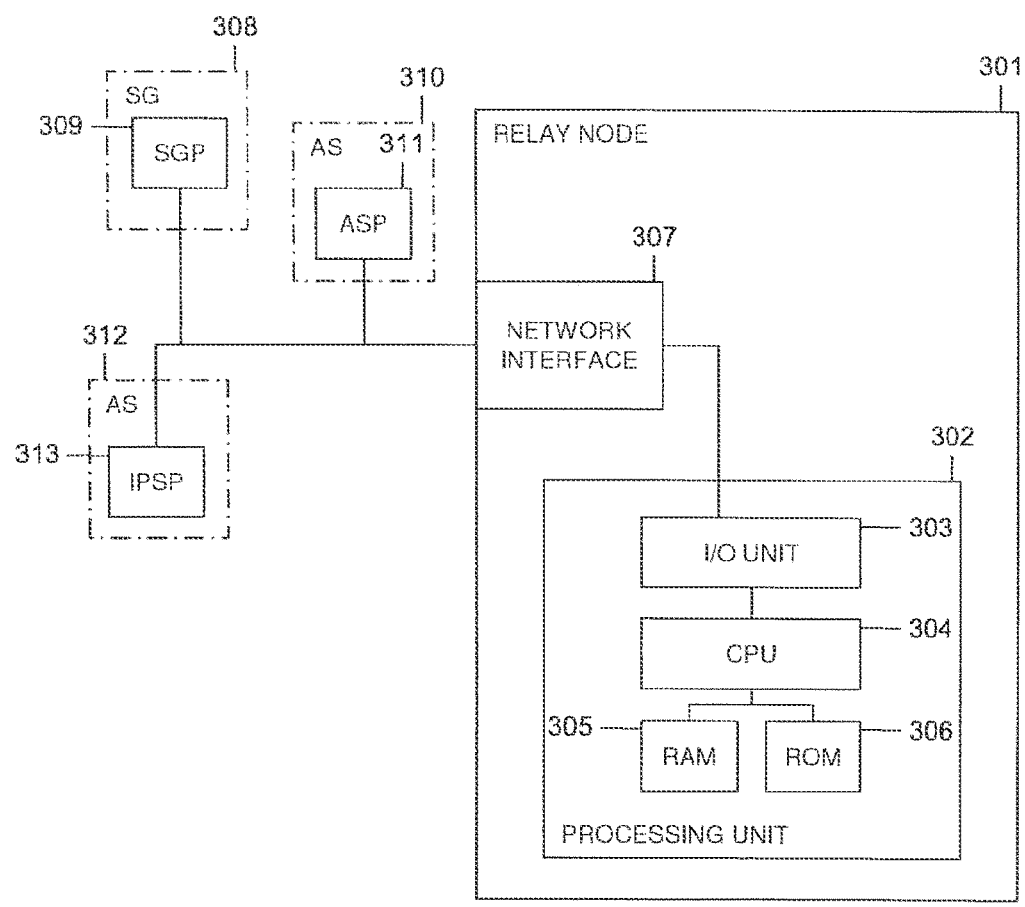
FIG. 3 shows a schematic block diagram of a network node according to an embodiment of the invention.

FIG. 3 schematically shows components of a relay node 301 comprising a processing unit 302. Processing unit 302 has an input/output unit 303 interfacing a central processing unit (CPU) 304. CPU 304 may be implemented as a single or as multiple microprocessors. CPU 304 interfaces read-only-memory 306 and random access memory 305. It should be clear that relay node 301 may comprise further types of memory, e.g. volatile or non-volatile memory, such as flash memory, a hard drive, and the like. Software in the form of computer programs may be stored on such a memory and may be executed on CPU 304. Programs executed on CPU 304 may implement the functional units shown in FIG. 2. In particular, CPU 304 runs local signaling processes providing different types of interfaces towards remote network nodes.

Input/output unit 303 connects to network interface 307. It should be clear that network interface 307 is different from the above-mentioned interfaces and provides the physical link to the IP network. As such, it performs the sending and receiving of IP data packets and may be part of an underlying link layer of the IP protocol stack. By network interface 307, relay node 301 connects to plural remote network nodes such as SG 308 implementing SGP 309, AS 310 implementing ASP 311 and AS 312 implementing IPSP 313. It should be clear that further IP routers may be located in the path between network interface 307 and said remote network nodes. Also, relay node 301 may comprise more than one network interface 307.

Figure 4:
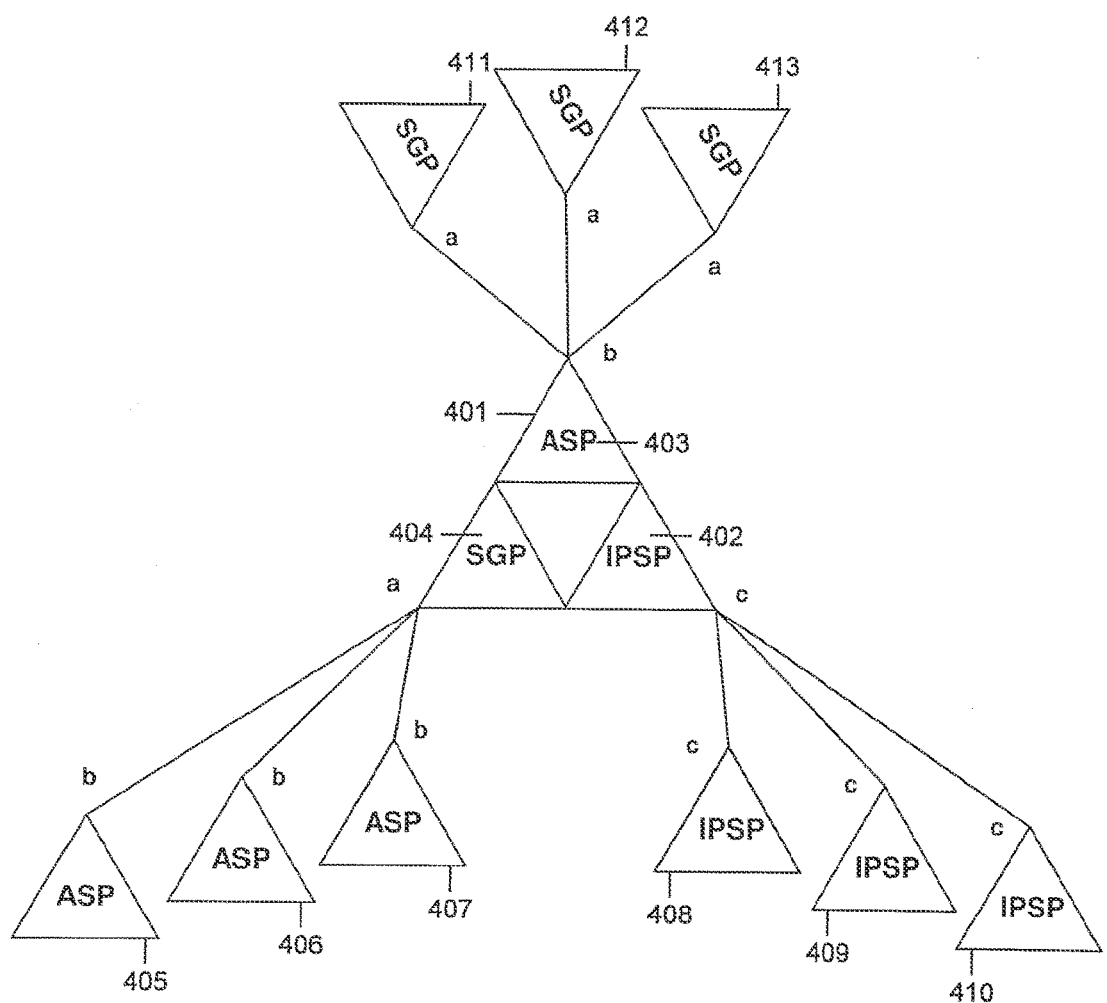
FIG. 4 is a schematic diagram of a network node according to an embodiment of the invention illustrating different types of signaling processes running locally on the network node and providing different types of interfaces.

A further embodiment of a relay node according to the invention is schematically shown in FIG. 4. In the following, the functioning of the relay node 401 shown in FIG. 4 will be described in general terms. While in the following reference will be made to the M3UA layer, it should be noted that this is clearly non-restrictive for the present invention and that any type of user adaptation layer is covered by the present invention, e.g. a SUA layer. Insofar as the following description of embodiments refers to a M3UA layer, it should be understood that all these explanations are equivalently applicable to any other user adaptation layer.

Relay node 401 is a SIGTRAN Relay node realized as a set of signaling processes without any type of legacy SS7 address assigned, such as point code or a global title (GT). SIGTRAN relay node 401 converts any possible interface of a SIGTRAN layer to any interface of the same SIGTRAN layer. That is, the SIGTRAN relay node acts as converter, aggregator and distributor of different types of SIGTRAN interfaces, management procedures and traffic messages.

The M3UA or SUA relay node according to the present embodiment is able to relay traffic messages, aggregate, distribute, ASP state maintenance (ASPSM), ASP traffic maintenance (ASPTM) and SS7 signaling network management (SSNM) procedures, and translate messages to each other at transfer, if needed.

The following types of remote network nodes or remote peers nodes may use the services of a SIGTRAN relay (e.g. M3UA relay) node: ASPs serving one or more ASes, IPSPs serving one or more ASes, and SGPs serving an SG and hosting signaling point management cluster (SPMC).

Support of each type above has its consequences on traffic routing and management/maintenance procedures performed in the relay Node, and types of messages that can be exchanged between the relay Node and its M3UA peer nodes. Each type of process has its own M3UA interface that defines types of allowed incoming and allowed outgoing messages.

The SIGTRAN relay node has one or more signaling processes of IPSP 402, ASP 403 and SGP 404 types and performs message routing and mapping of parameters and messages, according to the type of the destination signaling process, and local configuration in the relay node, for instance local configuration of originating and destination ASes.

The relay node can have a function that automatically discovers other relay nodes and coordinates their configuration, for example configuration of SIGTRAN signaling processes implemented in the relay nodes and their peer signaling processes in the SIGTRAN network.

In all-IP networks there is no need for SGs. Therefore, SIGTRAN SGs can be evolved/migrated to SIGTRAN relay nodes with relay without any change of SIGTRAN layers, which enables a hierarchical SIGTRAN network structure and allows a centralized and distributed framework where some auxiliary functions are allocated, such as policing, accounting, addressing information mapping/conversion, stateless services interworking (when possible), application level security gateways and the like.

By providing SIGTRAN relay nodes, a concept of SIGTRAN relay hierarchy may be realized. Appropriate use of SIGTRAN procedures allows efficient management and maintenance of such a SIGTRAN relay hierarchy. Operation and maintenance application (OMAP), message routing verification (MRVT) and SCCP routing verification (SRVT) functions defined for SS7 networks can be adapted to work in SIGTRAN relay hierarchy for the purpose of loop detection and prevention.

SIGTRAN relay nodes enable communication of SIGTRAN nodes, which do not implement compatible types of SIGTRAN signaling processes or have incompatible implementations of SIGTRAN interfaces.

The SIGTRAN relay node (401) may include a functionality that performs a conversion and aggregation of SIGTRAN interfaces and interface types such as ASP, SGP and IPSP types of interfaces and a relay or routing of application traffic from one remote signaling process to another remote signaling process using the same user adaptation layer, for instance M3UA or SUA, for incoming and outgoing traffic.

At message relay, the SIGTRAN relay node performs traffic balancing and distribution to Signaling Processes serving the concerned traffic range.

A further functionality may include a dynamic reconfiguration of a SIGTRAN relay network in case of route failures or inactivity of SIGTRAN signaling and relay processes, a conversion from one protocol version/implementation to another incompatible version/implementation of the protocol, an automated discovery of SIGTRAN standard processes and SIGTRAN relay nodes in the network, thus, building dynamically a SIGTRAN relay hierarchy, and a dynamic traffic management and relay network reconfiguration at a status change of relay nodes and remote signaling processes.

Functional extensions that enhance capabilities of SIGTRAN relay nodes may be provided as well as an interworking of SIGTRAN protocols in case they perform at the same level in the protocol stack. For example Relay process, i.e. a process running locally on the relay node, may interwork M2PA and M2UA protocols.

The SIGTRAN relay node is realized by a set of internal SIGTRAN signaling processes that perform conversion and aggregation of all possible SIGTRAN interfaces in the SIGTRAN relay node. That is, the network element 401 capable of SIGTRAN relay can relay traffic and management/maintenance messages received from and sent to different types of signaling processes that comply, or if needed do not comply with SIGTRAN standards (ASP, SGP, and IPSP).

FIG. 4 shows an example of SIGTRAN relay node 401 that performs conversion of SIGTRAN Interfaces.

The SIGTRAN relay node follows the SIGTRAN procedures in the way that fits the type of the remote SIGTRAN signaling process (interface type):

a) on the interface towards an ASP, e.g. ASP 405, 406 or 407, the relay node behaves like one or more SGPs, b) on the interface towards an IPSP, e.g. IPSP 408, 409 or 410, the relay node behaves like one or more IPSPs 402, c) on the interface towards a SGP, e.g. SGP 411, 412 or 413, the relay node behaves like one or more ASPs 403.

The local signaling processes, i.e. the relay processes keep locally up-to-date states of destination ASes (when remote destinations are ASPs or IPSPs) and SS7 destinations (when remote peers are SGPs), aggregate and distribute management/maintenance information to their peer-processes, and when needed perform meaningful conversion of management/maintenance messages.

In an example, a SIGTRAN relay node can use only one SCTP endpoint for all its SCTP associations towards remote SIGTRAN signaling processes. When traffic/address separation is needed the relay node may employ a dedicated SCTP endpoint per remote signaling process.

The relay node maps parameters, such as RC, NA, SPCs of incoming messages to other parameters and/or new values of the parameters according to a local configuration.

Thus, the general scheme of functioning of the SIGTRAN relay node 401 comprises translation of the original incoming message, be it maintenance, management, or traffic message, and its parameters to a new outgoing message when required by the procedures corresponding to the types of incoming and outgoing SIGTRAN interfaces.

For example, a message translation may consist of an old message type translation to a new message type, an old set of parameters/information elements translation to a new set of parameters/information elements, or old values of parameters/information elements translation to new values of parameters/information elements. As a result, old message type (class) may be changed to a new message type (class), old parameters may be removed, new parameters may be added, and parameters values may be changed.

For example, the following parameters may be added, removed or changed:

Version: A protocol version may be changed in case the relay nodes performs interworking of different SIGTRAN Protocol Versions and their incompatible procedures;

Message Class: A relay node may change message class in case different types of SIGTRAN interfaces are interworked, for instance SSNM messages may be changed to ASPTM or even ASPSM messages;

Message Type: A change of message type is normally required when relay node has to change the message class;

Message Length: The relay node sets the length of the outgoing message according to its converted content before the message is sent to the next hop, i.e. routed to the next remote signaling process.

Tag length-value fields of a parameter in the incoming message may be changed if one parameter type is replaced by another one or its value is changed. Thus, the following parameters may be altered: parameter tag, parameter length, and parameter value.

In the following various functional parts of a SIGTRAN relay node are considered separately and an interworking of SIGTRAN procedures, a conversion of message types and their parameters and values are shown.

A SIGTRAN relay node may comprise the following functional entities: a SIGTRAN process management unit, such as for process state management (Down, Up) and process traffic management; a traffic routing unit; a network management interworking unit; and a parameter mapping and address conversion unit.

Application/Process Redundancy

SIGTRAN Relay nodes may support different types of traffic mode type (TMT) for their peer signaling processes and may comprise their own redundancy schemes to the expectations of the peer applications.

Local ASPs and IPSPs signaling processes which are part of a distributed SIGTRAN relay node may chose to act towards each other according to loadshare or override TMT. This depends on the internal architecture of the SIGTRAN relay node or designed network hierarchy.

A SIGTRAN relay node may shield distributed SIGTRAN applications from application distribution schemes required or supported by their peer applications and adapt them to the expectations of each distributed application. That is, a SIGTRAN relay hierarchy may protect distributed applications from different traffic mode types and adapt TMTs to ones required and supported by the end nodes, for instance route nodes hosting applications.

A SIGTRAN relay node may provide support for notify (NTFY) procedures towards the running distributed application servers, which in their redundancy schemes rely on NTFY messages received from the peers nodes. Therefore, distributed application servers do not need to support NTFY procedures. Distributed SIGTRAN relay nodes use their internal communication protocols and do not need NTFY procedures triggered by application servers.

Traffic Routing in SIGTRAN Relay Node

A SIGTRAN relay node according to the present embodiment performs message routing functions. Message routing is based on information received in the message to be relayed, local configuration at a relay node and the current state of SIGTRAN processes capable of consuming the received message.

The routing may comprise a determination of the next route signaling process towards which the message is sent. After or in the process of determining the next hop signaling process, the relay node may perform conversion of parameters of the received incoming message to the parameters and their values of the corresponding outgoing message. The relay node may also derive the next hop signaling process based on old and new message parameters and their values as well as local configuration and routing data.

Figure 5:
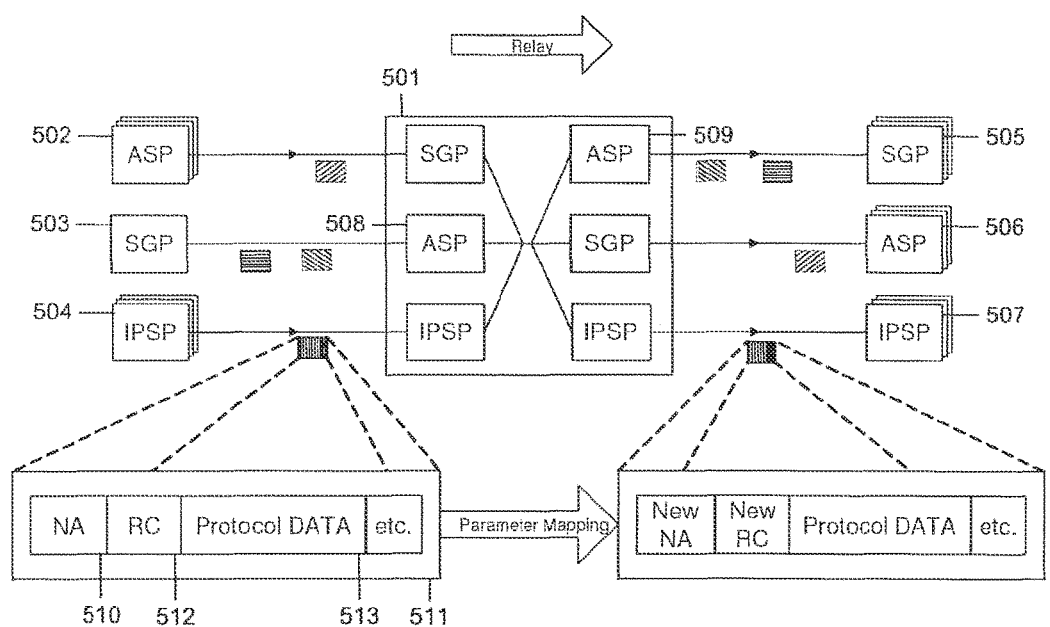
FIG. 5 is a schematic diagram illustrating the routing of messages according to an embodiment of the present invention, the routing comprising a parameter mapping.

FIG. 5 shows an embodiment of a M3UA relay node and illustrates a possible interface mapping and corresponding change of information elements in the relayed M3UA DATA message.

In FIG. 5 a message sent by one of the remote signaling processes 502 to 504 is routed by relay node 501 towards the remote signaling processes 505 to 507, in dependence on incoming message parameter values. Relay node 501 further comprises local signaling processes, which provide the interfaces towards the remote signaling processes. Solid black lines between the local signaling processes indicate that an interworking may be performed. For an incoming message received at local ASP 508, an address mapping and conversion of the message may be performed, and the message may be sent to SGP 505 via the local ASP 509.

In M3UA the only traffic message is DATA; it can contain the following parameters, which, when present, may be considered at relay: network appearance (NA), routing context (RC), and protocol data.

Network appearance 510 of the incoming message 511 identifies the network context the message belongs to. In particular, it means that NA uniquely identifies the corresponding M3UA network, market variant and network indicator (NI) value. Since M3UA peers on different sides of the relay node 501 may be configured independently, sometimes NA of the relayed message needs to be modified to the one that the next hop signaling process expects.

The RC 512 of the incoming message identifies the incoming RK that message belongs to. The incoming RK may not contain sufficient information to perform subsequent routing, although this is possible. When the incoming RK is not sufficient for subsequent routing, a traffic relay function of the relay node 501 can use the following parameters from "Protocol Data" 513 to select the outgoing RK and the next hop signaling process, which consumes the Outgoing RK traffic: a service Indicator (SI); a network indicator (NI), a destination point code (DPC), an originating point code (OPC), and a signaling link selection code (SLS)/circuit identification code (CIC) or the like.

It may happen that backward traffic corresponding to forward traffic is relayed symmetrically, that is, the traffic follows the same path through the network in the opposite direction. Then the incoming RK of the forward traffic becomes outgoing RK of the backward traffic, while the outgoing RK of the forward traffic becomes incoming RK of the backward traffic. Forward and backward traffic directions from the relay node perspective are irrelevant, since it relates to application logic. Thus, a RK can be incoming or outgoing in relation to the relayed message; this depends on the values of MTP routing label parameters, such as the service indicator, the network indicator, the destination point code, or the originating point code.

At the same time a RK can be both incoming and outgoing, but for different values of the MTP routing label parameters, given the network context (a RK is generally valid within one network context only).

Figure 6:
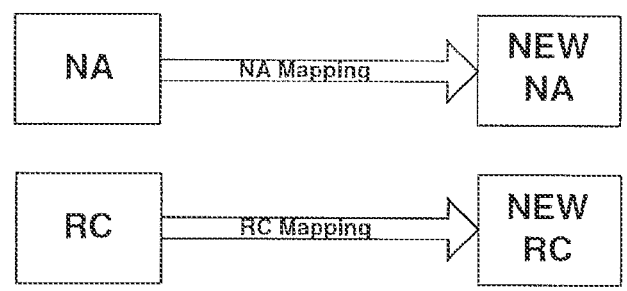
FIG. 6 is a schematic diagram illustrating the mapping of address-related parameters according to an embodiment of the invention.

At a relay of a DATA message, the outgoing message may differ from the original incoming message by a new NA and/or RC values. However, direct mapping of old values to the new values as shown in FIG. 6 is not always possible. For this reason the SIGTRAN relay node may perform several steps of parameters mapping in a process as shown in FIG. 7.

Figure 7:
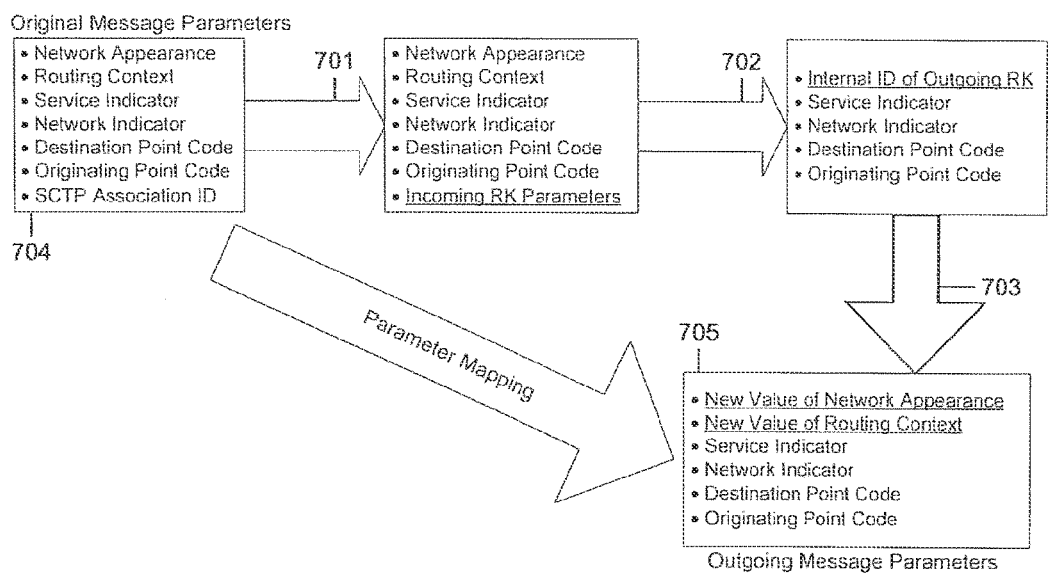
FIG. 7 is a schematic diagram illustrating the mapping of address-related parameters in more detail.

Based on the received parameters of the incoming message 704 and possibly the SCTP association id where the message has been received, the relay node first determines the incoming RK and fetches from the RK parameters those which are missing in the incoming message, and required for further message routing (Step 701 of FIG. 7). Then at step 702 the outgoing RK is identified, and at Step 703 the parameters of the outgoing message 705 are determined.

In case of ANSI networks at step 703, the SIGTRAN relay nodes may alter the value of signaling link selection code (SLS) according to ANSI standard adopted for STPs, or according to any other adopted algorithm coordinated throughout the SIGTRAN relay hierarchy. This may facilitate load balancing between the signaling processes of final destinations and of relay Hierarchy.

After the outgoing RK and parameters of the outgoing message have been determined, the relay node may select the next hop signaling process, that is, it may determine the SCTP association on which the message will be sent.

As an implementation option the outgoing routing key may have a list of its ACTIVE outgoing remote signaling processes and pointers to the corresponding SCTP associations. Having the list of ACTIVE remote signaling processes serving the RK, the relay node selects one of them based on information elements which will be included in the sent message. Selection of the outgoing remote signaling process shall secure in sequence delivery of the messages. That is, the same values of information elements, such as OPC, DPC, SLS, CIC, NI, NA, etc. considered at load balancing, may yield the same outgoing remote signaling process, as long as the set of the set of ACTIVE outgoing remote signaling processes serving the RK is not changed.

OPC, DPC, NA, NI may be considered at load balancing, although they do not vary within one RK. It may significantly improve load balancing for the case when remote signaling processes serve multiple RKs simultaneously and the number of ACTIVE outgoing remote signaling processes is large.

When the set of ACTIVE outgoing remote signaling processes serving the RK is changed, then the relay node may perform procedures similar to the MTP3 procedures of forced and controlled re-routing. For instance, messages can be buffered, for the period of reallocation of load balancing values to the new set of ACTIVE outgoing remote signaling processes of the RK.

When the outgoing remote signaling processes are of type SGP, the relay node may consider additionally the availability of the DPC within the SG. That is, relay node, may first select the outgoing SG where the DPC is available. Then, the relay node chooses one process from the set of ACTIVE outgoing remote signaling processes serving the SG.

Selection of a SG may be performed in case of a multiple SG scenario. SG selection may follow a method similar to the one discussed above, and similarly should secure load balancing and in sequence delivery of messages.

Once the outgoing remote signaling process is chosen, the message is sent on its SCTP association. A use of multiple SCTP associations towards one remote signaling process is also possible.

In cases when a relay node hosts several local signaling processes of the same type, in addition to the procedure of selection of the remote SG and outgoing remote signaling process, the relay node may select the local Signaling Process.

According to the description above message routing can be separated in different cases determined by the type of the remote peer: 1) routing to remote SGs/SGPs; 2) routing to remote ASPs; and 3) routing to remote IPSPs.

The data of the outgoing routing key provides the type of the remote peers, that is, the type of the remote signaling process selection that shall apply.

Some implementations may combine the latter two cases 2) and 3) in one, since it comprises only the step of selecting the target remote signaling process (ASP or IPSP) from the set of the active outgoing signaling processes serving the outgoing RK. The list of the signaling processes is normally linked in the RK data. The ASP/IPSP is selected based on internally adopted algorithms that secure in-sequence delivery.

In the first case routing can be performed based on the provisioned routes to SS7 destinations (SPCs) accessible via the SG. Each route is bound to an SG so that all SGPs of the same SG can receive traffic for an SS7 destination unless the accessibility status of the destination at the SG (route state) is changed. The route/SG is selected based on relay node internal mechanisms that secure in-sequence delivery when necessary. Thus, the routes/SGs can be selected based on priorities assigned dynamically or by provisioning. Once the route/SG is selected, the relay node selects one of the SGPs of the SG where the RK is active. In case of M3UA this can be done based on the SLS allocation to the SGPs.

In fact, depending on the scenario above, received traffic messages may contain different information elements that determine message routing. That is, information elements required for routing can be different or have different meaning in different types of signaling processes. For this reason, a generic mechanism is considered above, which extracts all SS7 specific parameters sufficient for subsequent routing of the message to the next hop signaling process.

The traffic relay function can use the following parameters from "Protocol Data" to select the next hop signaling process (and local signaling process when more than one local process is used towards the destination): service indicator; network indicator, destination point code; originating point code; and signaling link selection code (SLS).

In case of SUA relay additionally the following information elements can be considered, altered, replaced, added or removed at message relay: routing context; source address; destination address; destination reference number (DNR); and source reference number (SRN).

The relay node can also use them for message routing and determining the next hop towards the final destination (and next hop signaling process) of SIGTRAN traffic messages, such as DATA of M3UA or CORE, CODT, COAK, etc. Regarding details on the above message types, reference is again made to RFC 3868 and RFC 4666.

In the following a list of parameters is provided and possible scenarios when a SIGTRAN relay node can modify them are outlined.

Network Appearance: A relay node may change the value of a network appearance parameter, when the relay node performs relay between different SIGTRAN networks, and for instance, has to translate or map source and destination addresses, or OPC and DPC addresses.

Routing Context: A relay node may change the RC value when the next hop signaling process in combination with the relay node uses different RC value to identify the AS the message belongs to. Depending on the type of the next hop signaling process the RC may point either to the local AS in the relay node (when next hop is an SGP) or to a remote AS (when the next hop is an ASP or an IPSP);

It may be even desirable that remote ASes use different RC values than the RC values used by relay processes, then the relay processes can distinguish local ASes from remote ASes based on RC values. For instance RCs pointing to local ASes in the relay node, that is, to incoming traffic, may belong to a dedicated range of RC values, thus the concept of RC label may be defined similar to DRN and TID labels. RC labels can be used for traffic management procedures in SIGTRAN relay hierarchy.

Network Indicator: The relay node may change the value of a network indicator parameter, when the relay node performs a relay between different SIGTRAN networks, and for instance, has to translate or map source and destination addresses, or OPC and DPC addresses.

Message Priority: A relay node may change the value of a message priority parameter, when the relay node performs relay between different SIGTRAN networks, and for instance, communicating SIGTRAN networks or their NEs have different capabilities in respect to message priority/congestion handling.

Destination Point Code and Originating Point Code: A relay node may change the value of destination point code parameter, when the relay node performs a relay between different SIGTRAN networks, and for instance, has to translate or map source and destination addresses, or OPC and DPC addresses in order to hide the actual network addressing schemes in communicating SIGTRAN networks (NWs).

Originating Point Code List: A relay node may change the values of originating point codes in the originating point code list parameter, when the relay node performs a relay between different SIGTRAN networks, and for example needs to register RKs representing relayed traffic, when there is a need to hide the actual network addressing schemes in communicating SIGTRAN NWs.

Traffic Mode Type: Relay nodes may use different TMT than the destination signaling process, therefore relay nodes need to convert TMT when needed in the SIGTRAN procedures.

There are some load sharing related parameters which are similar to TMT and can be similarly interworked at relay.

Relay nodes do not expect that a remote signaling process follows one specific traffic distribution scheme that is bound to the traffic distribution adopted by the destination signaling processes; depending on the preferences of the destination signaling processes, SIGTRAN relay processes may adapt traffic distribution schemes used at remote signaling processes to the scheme adopted by destination processes. For instance relay nodes may perform a mapping of the following parameters and their values: a load selector, a load selection, and a load sharing label; Load sharing labels may be derived from the message parameters, such as the SLS, a sequence control parameter and the like.

User Protocol Data: If relay processes do not bridge different SIGTRAN networks, in majority of cases there is no need to modify user protocol data parameter at relay; however, in some cases this may be needed to provide for an interworking of incompatible implementations at signaling peers. For instance SIGTRAN relay nodes may change addressing information contained in the user protocol data.

The relay node may perform an encryption of user protocol data at network borders and add a security header to the message; this may be done depending on the type of the application the messages belong to or information carried in the message; for instance SI, subsystems member (SSN) or other parameters in the destination address may determine whether user protocol data needs to be encrypted and what algorithm and security keys shall be used. Put in other words, a relay node may act as a security gateway for the relayed user protocol data, and encrypt/decrypt transferred information based on security associations provisioned/established between relay node and its peers.

There are SIGTRAN parameters which represent an interest for their direct SIGTRAN peers only; in particular this applies to relay nodes. Those parameters do not need to be relayed by relay nodes, and relay nodes can use them for their own needs. Examples of such parameters are:

INFO String: Since a INFO string can be present in majority of SIGTRAN messages, it might be useful to send data related to proprietary protocol extensions as part of the INFO String information element (IE) using a type, length, value (TLV) format;
Diagnostic Information;
Heartbeat Data;
Error Code: Depending on the traffic scenario and the error code value, relay nodes may decide to relay, drop, or modify it;
Status;
ASP Identifier;
Correlation ID.

The following list is an example of other SIGTRAN parameters that SIGTRAN relay nodes can use and translate at message routing and transfer to the next SIGTRAN node on the traffic path and if needed the relay node could interwork corresponding procedures.

Destination Address, e.g. called party address (CdPA)
Source Address, e.g. calling party address (CgPA),
User/Cause
Congestion Indications
Concerned Destination
Routing Key
Registration Result
Deregistration Result
Local Routing Key Identifier
Registration Status
Deregistration Status
SS7 Hop Counter
Source Reference Number
Destination Reference Number
SCCP Cause
Sequence Number
Receive Sequence Number
ASP Capabilities
Credit
Data
DRN Label
TID (Transaction Identity) Label
Address Range
SMI (Subsystem Multiplicity Indicator)
Importance
Protocol Class
Sequence Control
Segmentation
Congestion Level
Global Title
Point Code
Subsystem Number
IPv4 Address
Hostname
IPv6 Addresses
Relay Nodes in SIGTRAN Network SIGTRAN relay nodes performing a relay of user messages and providing for an interworking of network management and traffic management procedures at a same user adaptation layer may build up a SIGTRAN relay network for the concerned user adaptation layer.

From a traffic routing perspective, a symmetric set up of a SIGTRAN network is not mandatory. Backward traffic that relates to one session, transaction or call from a node can take a different path than the incoming traffic to the node takes for the same session, transaction or call. There are no standard means visible in information elements of SIGTRAN messages that would force asymmetric routing, except for the case of double exchange (DE) in the IPSP model.

SLS allocation (static or dynamic) to different signaling processes receiving/sending traffic for different ASes may influence selection of the next hop on the traffic path. However, in case of SGP to ASP, ASP to SGP and even SGP to SGP the setup of the signaling transport network from RKs perspective and corresponding signaling processes remains symmetric. Therefore, asymmetric routing of traffic in case of SGP to ASP, ASP to SGP and SGP to SGP can only be achieved by proprietary provisioning and cannot be driven by standard SIGTRAN procedures from ASPs towards the SGPs. At the same time SGPs using SS7 signaling NW management (SSNM) procedures can automatically set up an asymmetric relay network if needed and which may be driven by provisioned priorities of the signaling processes serving the same RK.

In SUA, a presence of SSNs in SSNM changes the state of the remote SSN or SCCP, however, this does not change a routing of messages, it may only disable/enable routing of messages for the affected SSN/remote SCCP.

Figure 8:
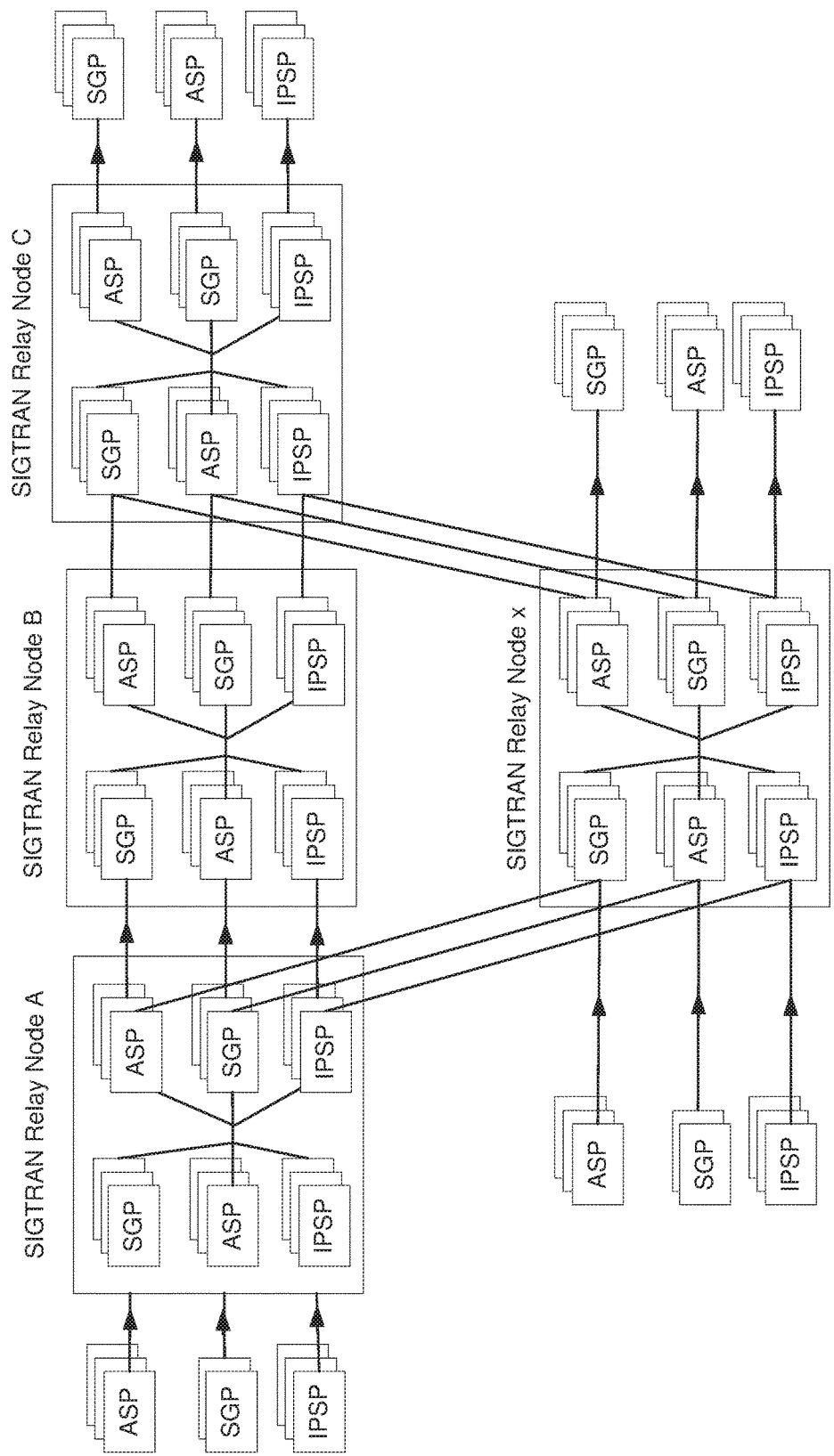
FIG. 8 is a schematic diagram of a SIGTRAN relay network comprising plural network nodes according to an embodiment of the invention.

In a general setup of a SIGTRAN relay network as suggested here, the nodes do not need to know whether their peer nodes are SIGTRAN relay nodes or they are end nodes which consume and originate traffic. That is network nodes can remain unaware of relay nodes in the network. FIG. 8 shows an example of a SIGTRAN relay network where each node believes it talks to a SIGTRAN end node, while in fact there are SIGTRAN relay nodes in the network.

M3UA Relay nodes do not need to have an own SPC. Therefore, M3UA relay nodes are point code less nodes and addressing is moved to the SCTP and IP layers. None of the M3UA messages initiated by an M3UA relay node needs an own SPC included, even signaling remote management (SNM) messages (like DUNA/DAVA) do not need to have an OPC.

Figure 9:
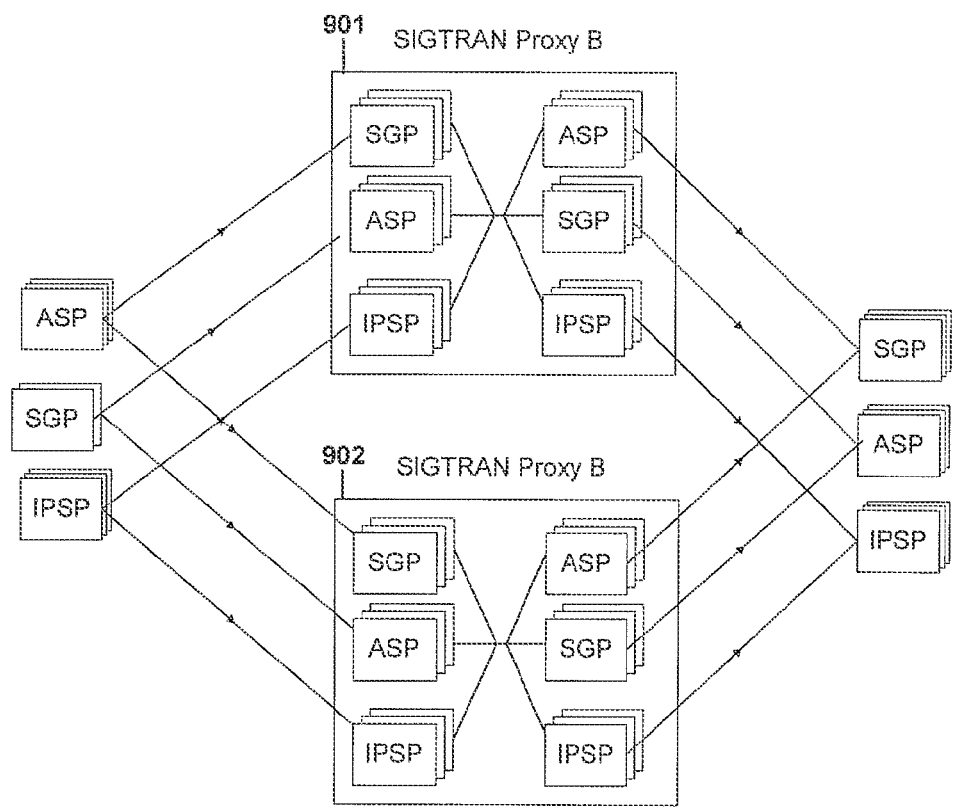
FIG. 9 is a schematic drawing showing a network node according to an embodiment of the invention as a SIGTRAN proxy node.

The embodiment of FIG. 9 shows the case of a SIGTRAN relay stage. The relay nodes may be referred to as SIGTRAN proxy nodes or SIGTRAN interface converter node.

As FIG. 9 shows, the proxy node 901 or 902 will act simultaneously as SGP, IPSP, and ASP on its SIGTRAN interfaces following the rules and procedures of the corresponding SIGTRAN protocol. Thus, the SIGTRAN proxy may interwork ASP traffic management and SS7 network management procedures on the left side with ASP traffic management and SS7 network management procedures on the right side SIGTRAN interfaces. The granularity of SIGTRAN routing keys provisioned in a SIGTRAN proxy 901 or 902 may allow for this interworking.

In case of a M3UA proxy, a RK shall define a traffic range served in one HW unit at most. Thus in case of HW unit availability change, this event can be indicated from SIGTRAN proxy to peer signaling processes IPSPs/SGPs without affecting traffic handled by other HW units. For this purpose the SIGTRAN proxy may use ASP traffic maintenance (ASPTM) procedures for routing contexts that point to the affected traffic range.

Automated Discovery of SIGTRAN Relay Processes

In an embodiment of a hierarchical SIGTRAN relay network, relay nodes can automatically discover their peer relay nodes and exchange their configuration.

OMAP in SIGTRAN Relay Network

OMAP applications have been defined in SS7 for MRVT and SRVT applications, which detect loops and routing problems in SS7 networks. OMAP applications can be adapted to detect loops and routing problems in SIGTRAN relay networks. For this purpose, OMAP procedures may be enhanced to work on node identities other than SS7 addresses. OMAP applications in a SIGTRAN relay network may use the SIGTRAN relay network without any functional modifications for a transport of OMAP messages.

OMAP procedures in a SIGTRAN relay network can identify problems due to SIGTRAN relay policy defined in relay nodes, failures in the SIGTRAN relay network, and wrong provisioning of routing keys in SIGTRAN relay nodes.

OMAP tests provide either positive or negative responses. OMAP tests are independent of the network structure. OMAP tests can be limited by one network and may not cross network boundaries.

OMAP tests may be configured to
1) detect loops in the routing within the SIGTRAN relay network,
2) detect excessive length routes in the SIGTRAN relay network,
3) detect unknown traffic ranges or destinations provisioned in the SIGTRAN relay nodes,
4) check the bi-directionallity of signaling relations in the SIGTRAN relay network,
5) check whether provisioned RKs allow proper interworking of NW management procedures in the SIGTRAN relay network.

On demand an OMAP test can be started from a specified SIGTRAN relay node having a given identity. An OMAP test procedure may be performed for a specified and tested traffic range defined via a SIGTRAN routing key, or by means of other identities or addressing defined in SIGTRAN relay nodes. On demand OMAP tests can be scheduled and initiated from a dedicated node in the SIGTRAN network, at a provisioned time.

Periodic OMAP tests can be scheduled. Scheduled tests can include all provisioned traffic ranges. The tests for different traffic ranges can be spread during a given period, and can be restricted to run only during allowed hours. It can be scheduled to run forever or for a specified number of times.

Network Management Using a SIGTRAN Relay Node

According to an embodiment, an accessibility status of the destinations at the SIGTRAN SGs (e.g. route states) is changed due to received DUNA messages, which make routes via SGs inaccessible. SSNM procedures modify the states of the routes towards SS7 destinations via a SIGTRAN SG. DAVA messages change the state of the route to accessible.

Interworking of ASPTM and SSNM Procedures

FIG. 4 and FIG. 5 show SIGTRAN relay scenarios and possible types of remote signaling processes (e.g. processes 405-413). According to the present embodiment, a SIGTRAN relay node relays traffic messages and interworks NW management and traffic management procedures.

SIGTRAN relay nodes may provide support for SIGTRAN NW management procedures or their traffic management equivalents for peer signaling processes and for traffic ranges they serve. For example, a M3UA traffic range can be defined by a signaling point residing in the M3UA NW and identified by its SPC and NI or NA. The traffic range may also be served by a distributed node. SIGTRAN relay nodes shall notify peer signaling processes when a traffic range changes its status or cannot be served any longer, for example due to unavailability of serving signaling processes. In general, when a certain traffic range changes its status, all concerned signaling processes may be notified accordingly by corresponding ASPTM or SSNM messages. That is, SIGTRAN relay nodes shall notify peer signaling processes when a traffic range "changes its status" by sending DUNA, DAVA, SCON, ASPAC, and ASPIA messages to peer signaling processes. Use of a particular message type is determined by the type of the remote signaling process towards which the message is sent.

SIGTRAN Procedures

When a SIGTRAN relay node detects a change of a routing key status or destination status, the SIGTRAN relay node shall indicate to its peer signaling processes that the affected traffic range, e.g. SPC, is accessible/inaccessible/congested. This can be done by sending DUNA, DAVA, SCON, ASPAC, and ASPIA messages to SIGTRAN peers. Use of particular message type is determined by the type of the notified remote peer.

The table of FIG. 10 summarizes possible indications, and corresponding SIGTRAN (e.g. M3UA) messages depending on the type of the notified remote peer and destination status.

The first column of the table of FIG. 10 shows the new status of a M3UA destination. In dependence on the type of the remote M3UA network node that has to be modified shown in column 2 the relay node or signaling proxy node (SPX) acts according to a particular role given in column 3 so as to provide a compatible interface towards the notified peer node. The particular interface or the role the SPX takes defines messages that may be sent as given in column 4. The management or maintenance procedure towards which these messages belong are listed in column 5.

When the SIGTRAN relay node acts as an SGP, it may send a DUNA, DAVA, or SCON message, and populate the message with an affected point code parameter or other addressing information identifying the traffic range, and if needed with NA, RC, and congestion indicators.

As can be seen from FIG. 10, when a SIGTRAN relay node acts as an ASP or IPSP, it may send an ASPAC, ASPIA, or SCON message.

The granularity of provisioned RKs shall allow an interworking of network management procedures. For example, when a provisioned RK contains several destination SPCs and one SPC from the traffic range can become unavailable independently from the other SPCs, then interworking of network management procedures may not be possible and provisioned RKs should be reconsidered. This kind of situations can be detected by adopted OMAP procedures.

In case of M3UA Relay networks, in order to avoid problems in interworking NW management procedures, RKs with at most one destination SPC plus optional SI, and without OPC may be used.

Functional Enhancements at Relay Nodes

According to the following embodiments, functional enhancements may be centralized at a network node, i.e. relay node, according to this invention.

Network Address Conversion

On administrative borders there might be a need to translate SS7/SIGTRAN addresses from one numbering plan/addressing scheme to another.

Also within an administrative domain there can be SIGTRAN signaling processes that have limited addressing capabilities.

Therefore, SIGTRAN relay function can host a network address conversion function, which may be configured to convert network addresses from one SS7 specific numbering plan to another and/or from one type of address, such as SS7, to another type, for example to IP-Network specific identifiers like hostnames, IP addresses, universal identities or even Ethernet specific addresses.

Message Screening

In all IP networks with an evolution of SIGTRAN peers, there is a risk of inhomogeneous capabilities of SIGTRAN peers. SIGTRAN signaling processes may have different versions of SIGTRAN protocols and may use incompatible parameters. In such cases, a SIGTRAN relay node can use a message screening function to remove or replace not supported parameters.

SIGTRAN Protocol Conversion

With the evolution of SIGTRAN, the working group (WG) develops new protocol versions. New versions sometimes may be incompatible with the old versions. Therefore, a SIGTRAN relay node may provide for a conversion of SIGTRAN protocols from one version to another or from one set of protocol capabilities to another. One example is the M3UA standard, which is defined in two RFCs, where RFC 4666 obsoletes RFC 3332.

Policing

SIGTRAN relay nodes placed at the border between two SIGTRAN networks may host an enhanced policing function that restricts the network services available to other operators. Thus, policing may restrict a relay of traffic as well as of management signaling.

The policing function may be based on an analysis of application level control signaling, that is, an analysis of SIGTRAN user data.

SIGTRAN Remote Management Controls/Traffic Restriction

According to an embodiment, a relay node may implement remote management control procedures.

Remote SIGTRAN management controls provide an additional means of protecting the network from congestion or failure, and may be activated by the operator or a remote signaling management system.

A local congestion level can be set by a command for a particular remote peer. SCON or another message indicating an own signaling process congestion level is sent in response to messages received with a priority/importance which is less or possibly equal to the set level.

This procedure can also be used for manual graceful or forced isolation of the signaling process from new signaling traffic coming from a particular signaling process or SS7 destination. To achieve a graceful isolation, the signaling process indicates a congestion level that allows traffic for ongoing calls and multimedia sessions while preventing a relay of new unallocated traffic. For forced traffic isolation, the relay process sends to "concerned" signaling processes an INACTIVE message for a particular "affected" routing context, or a DUNA message for a particular SPC and optionally SSN or SI, or a DUPU message for a particular SPC and SI.

In some cases, a DRST message can be used to indicate a restriction of traffic for a particular signaling flow.

In order to resume relay of SIGTRAN traffic, the process may cease the own congestion level and/or stop sending SCON messages in response to remote peers/signaling processes. ACTIVE and DAVA messages can be sent to remote peers to indicate an availability of the relay function for one or more remote SS7 destinations or ASes.

Isolation and resume of relay traffic can be performed for a particular signaling flow which is determined by supported granularity of SIGTRAN RKs and/or load sharing/distribution mechanisms.

Application Level Enhancements

According to further embodiments, a relay node may comprise functions or application level enhancements, as detailed in the following sections.

Stateless Application Logic

Applications related functions that do not require complex stateful logic such as SMS filtering, SMS screening, SCCP message screening and filtering, roaming steering, may be placed within SIGTRAN relay nodes.

Conversion of Relayed Application Data

In large evolved SIGTRAN networks there will be many nodes that support particular global and regional standards of applications and in some network scenarios SIGTRAN relay processes can adapt application data depending on its SIGTRAN destination process to the market variant and capabilities that are supported by the destination signaling process and its applications.

Application Address Conversion

In All-IP networks new applications appear. New applications may not be able to use SS7 addressing at application level, that is, there can be SIGTRAN ASes that have limited IP specific addressing capabilities, while there may still be a need to interwork with nodes identified by SS7 addresses only.

In this case, a conversion of application level addresses from SS7 and other PSTN/PLMN/ISDN address types to addresses specific for IP networks and vice-versa needs to be performed in the network. For instance IP addresses, hostnames, global identities, Ethernet specific identities, mobile node locators, etc. can be converted to SS7 addresses. This may be needed to provide for interworking of old PSTN, PLMN or IN services with new emerging services. In such cases SIGTRAN relay nodes may provide for interoperability and convert/map application level addresses to the type that destination ASes or SS7 applications can recognize.

The following sections will describe procedures which may be implemented in embodiments of a network node, i.e. relay node, according to the invention or in embodiments of relay networks according to the invention. Further, network entities such as network nodes or signaling processes which may be part of such a relay network are described. It should be clear that while the following procedures and network entities may be used in combination with embodiments of the invention, the description is clearly non-restrictive, and a relay node according to the invention may be used in network environments other than the ones described below.

SUA Overview

Relay nodes according to the embodiment of the invention may be used in SUA, M3UA or other protocol environments. SUA is a protocol used for the delivery of SCCP-user part messages over IP network from SEPs to SEPs. In SS7 networks SCCP is used for delivery of SCCP-User Part messages between peer SEPs. Similarly SUA can be used for delivery of SCCP-User Part messages. It shall be mentioned that initially the SIGTRAN WG introduced xxUA and SCTP to transport SCCP-User primitives from a SCCP layer located in a SG to SCCP-Users located in distributed IP-based nodes. However, the SUA protocol has evolved to a delivery mechanism of SCCP-User Part messages between peer SEPs in IP networks and replaces the SCCP protocol in an IP framework. For instance, an address mapping function (AMF) function of SUA is able to perform a global title translation (GTT). The peer SEPs can reside in SS7 or IP networks. The following interworking scenarios are possible:

One SEP resides in a SS7 network and the other SEP is in an IP network

Both SEPs are in an IP network, and signaling is transported via IP network via direct communication between SEPs Both SEPs are in an IP network, and signaling is transported via relay nodes in an IP network.

Both SEPs are in an IP network, and signaling is transported via a transit SS7 network. This case is a double application of the scenario in the first bullet.

Both SEPs are in a SS7 network, and signaling is transported via a transit IP network.

SUA allows each of these scenarios. However, not all of them are described at the same level of detail in SUA RFC 3868.

According to section 1.4 of RFC 3868, the SUA layer is able to provide the following services:

Support for the transport of SCCP-User Messages

SCCP Protocol Class Support

SUA Native Management

Interworking with SCCP Network Management

Signaling nodes residing in IP networks can have a distributed architecture and SUA provides for distributed IP-based signaling nodes by implementing the concept of a signaling process, and dedicated functions described in the RFC, such as support for the ASP Fail-over Models, which are also referred to as traffic mode types (TMTs).

The internal architecture of distributed IP-based signaling nodes is considered an implementation issue; it may be distributed implementation of functions defined in RFC 3868 or a distributed implementation of application protocols or both.

Section 1.5 of RFC 3868 describes some of the SUA layer's internal functions such as SUA Layer Management and SUA Flow Control Address Mapping Function (AMF)

Congestion Management

SCTP Stream Mapping

There functions are required to realize SUA services; the subsequent chapters of the RFC 3868 detail them to some extent. The functions and procedures described in RFC 3868 may be implemented in embodiments of a method, a network node and a relay network according to the invention.

Signaling Processes

A possible signaling process configuration is described below. In a SUA scenario, signaling processes are the entities that use the SUA protocol to communicate with each other. Each signaling process owns a SCTP endpoint, which is used for receiving and sending SUA messages. From the viewpoint of the sender (i.e. the sending signaling process) its peer signaling process is a stand-alone node characterized by its SCTP endpoint. The stand-alone node may comprise the complete protocol stack starting with physical layer and finishing with the highest layer (e.g. the user application layer or the SUA layer in SGP or relay node).

One signaling process may not use at the same time two local SCTP endpoints towards the same signaling process peer, although it can use different SCTP endpoints during non-overlapping time intervals.

Signaling Processes are configured to serve a certain range of traffic. Dynamic configuration can be used as well as manual. Signaling processes able to serve the same range (or overlapping ranges) of traffic are part of one distributed IP-based signaling node. They may form a redundant "cluster" of signaling processes. These signaling processes can act in three different traffic mode types (TMT): loadsharing, override, broadcast. The TMT can be dependent on the particular traffic range.

Internal communication between signaling processes of the same cluster is not part of any standard, and it is considered implementation dependent. Information shared between signaling processes within a cluster depends on TMT in use, it provides for consistent interworking with independent SUA peers, and it is dependent on the internal architecture of the distributed IP-based signaling node, that is, cluster of signaling processes.

Signaling Process Types

A signaling process can be of the following three types: Signaling Gateway Process (SGP), Application Server Process (ASP), and IP Server Process (IPSP). The SUA RFC 3868 allocates different functionality to different types of Signaling Processes. The RFC 3868 also puts restrictions on the types of messages that can be sent by and received from each type of signaling processes. This fact contradicts the claim of the abstract in SUA RFC that the protocol is designed to be modular and symmetric. The symmetry of the SUA protocol was one of the initial requirements put on SUA to allow interworking in diverse architectures, such as a signaling gateway to IP signaling endpoint architecture as well as a peer-to-peer IP signaling endpoint architecture. The RFC does not prohibit explicitly use of messages by specific signaling process types; the RFC simply does not mention use of certain messages towards ASPs, IPSPs, SGPs, thus they may be treated as errors by some implementations.

The SUA specification in addition to signaling processes types has the concept of signaling process capabilities (see section 3.10.9. ASP Capabilities in, which adds the relay node as a new entity in SUA networks. The concept of ASP capabilities is not detailed sufficiently, for instance there is no specification of relay node behavior. The intention was to enable SUA signaling processes acting as networks ASPs to act as either pure ASP, or simultaneously as an ASP and an SGP, or as an ASP and a relay node, or an IPSP. Then depending on the allocated interworking capabilities a SUA signaling process can act as IPSP, interworking value 0x0 indicates no interworking with SS7 Networks;

ASP, interworking value 0x1 indicates IP signaling endpoint (ASP), interworking with SS7 networks;

ASP equipped with SG capability, interworking value 0x2 indicates signaling gateway;

Relay Node, that is, an ASP equipped with relay capability, interworking value 0x3 indicates relay node support.

The intention was that signaling process in SUA is able to send and receive protocol messages and perform additional functions according to its interworking capabilities. However, the RFC does not define behavior and procedures of signaling processes with relay capability.

Communication Scenarios

Table 1 shows possible communication types clearly mentioned in SUA RFC 3868.

TABLE 1

| Communication Type | Comment |
|---|---|
| SGP to ASP | described in RFC |
| ASP to SGP | described in RFC |
| ASP to IPSP | described in RFC |

Although SUA RFC defines SUA relay capability, corresponding communication scenarios are not defined.

Routing Keys and Application Addressing

SCCP applications are addressed (identified) in SS7 networks by SSNs, which are used within a node to distribute traffic to the right local user; additionally in SS7 networks GTs and SPCs are used for routing of SCCP-User messages from originating signaling nodes to destination nodes.

The same principles stay valid for application addressing in SUA networks (SCCP applications are addressed using SSNs, GTs and SPCs); additionally application addressing is enhanced with IP specific addressing and new traffic loadsharing/distribution mechanisms.

As mentioned above there are no new SUA-User protocols defined in any standardization forums. Existing SCCP-Users do not put any new requirements for new services from SUA signaling transport, as compared to SCCP, such as handling of individual signaling relations. The existing SS7 applications (e.g. ISDN user part (ISUP), bearer independent call control (BICC), bare station subsystem application part (BSSAP), radio access network application part (RANAP)) have their own mechanisms at application level to deal with signaling relations, in particular they have their own messages defined for that purpose such as circuit blocking and reset or UP testing. However, the IP signaling nodes can have a distributed architecture, and therefore they require new traffic loadsharing/distribution mechanisms. These mechanisms can reside in the SUA Layer of the last hop nodes interfacing directly the IP distributed signaling nodes.

Routing Keys

The routing key in SUA uniquely defines a range of SCCP-Users traffic. It is defined by specifying sets of two ranges: Destination addresses range and optionally source address range. Routing keys are mutually exclusive in the sense that one signaling message cannot match more than one routing key within a SUA node, i.e. within an SG or a signaling process. Uniqueness of RKs within a node does not exclude the possibility of aggregated RKs in hierarchical relay networks.

The definition of the routing key is two-fold. Firstly, it defines the SS7 destination address of the distributed IP based SS7 application; secondly, it contains a traffic distribution/loadsharing mechanism based on source addresses. Traffic distribution based on originating addresses is a well known method to distribute traffic more or less evenly, while keeping the application traffic routed in a connection/transaction persistent way.

Initially M3UA RK contained CIC ranges adding another traffic distribution method to RK, which has been removed from the M3UAbis draft. SUA RFC has also some statements about TIDs as part of the routing keys, although according to the definition the RK parameter does not contain any TID related parameters such as TID labels. This shows that RK concept both in M3UA as well as in SUA had a loadsharing component in addition to addressing.

The routing key may specify the direction of traffic (from source) towards destination addresses. It is used for routing purposes in traffic originating or intermediate IP nodes.

A routing key defines additionally the network appearance (if needed), and TMT that the receiving signaling processes use and sending signaling processes have to support, for instance when distributing traffic.

The routing key (and SS7 destination addresses in particular) does not necessarily identify uniquely the IP network entity (i.e. signaling process) receiving SCCP-User messages. The receiver may be an intermediary replicated node (SGP), or one of the multitudes of signaling processes capable of serving the routing key. To chose IP destinations the SUA layer employs additional traffic loadsharing/distribution mechanisms, such as sequence control, TID and DRN.

Routing Key Granularity

SUA Layer is able to provide finer routing granularity than a legacy SS7 protocol stack. In general, the RK is defined as a pair of destination address and source address, or as an address range (i.e. a pair of contiguous destination address range and source address range), or as a set of address pairs and/or address ranges. This is achieved by use of multiple address range, destination address, and source address parameters in the routing key.

Destination and source addresses can have the following granularity in the routing key

- GT granularity, where the address contains a set of GTs or GT ranges, optionally the address may include SPC and SSN
- SSN granularity where the address contains an SSN (or SSN range) and optionally an SPC and/or a GT
- SPC granularity, where the address contains an SPC or an SPC range with all possible SSNs.
- Hostname granularity, where the address contains the hostname, and optionally the SSN range
- IP address granularity, where the address contains the IP address, and optionally the SSN range.

Any of the above levels of address granularity can be used separately for source and destination addresses and combined in an RK. All parameters in the routing key are optional according to SUA RFC 3868. Therefore the marginal and rather unrealistic example is the RK without any parameters specified, this RK consumes all traffic for particular NI corresponding to the network the signaling process belongs to. In case the source address is not specified in the RK, any value is allowed.

Primarily, finer than SS7 routing granularity is needed to support various architectures of distributed IP based signaling nodes. For instance finer granularity allows distribution of SS7 applications over a broader number of IP hosts than is otherwise possible, without allocation of unique point codes and GTs to IP hosts. Thus each host is allocated as much traffic as it can process. This can be part of the design of a particular SIGTRAN network, where traffic models are considered, SIGTRAN nodes dimensioned, and RKs defined.

The use of a source address granularity in RKs allows also for SG architectures with multiple SGPs that may suffer from partial loss of SS7 connectivity, for more details see section 5.1.1.4 on page 31 of RFC 3868.

Application Servers

In SIGTRAN, an application server (AS) may be considered a logical concept in SIGTRAN that represents a part of a distributed SS7 application. An application server is characterized by the range of SS7 traffic it can receive, that is, by its routing key.

IPSPs and ASPs can be configured to serve multiple application servers (i.e. routing keys). Each application server can be active or inactive within a signaling process (IPSP, ASP or SGP); this is managed via ASPTM messages. When serving traffic of an AS, signaling processes operate using the TMT associated with the corresponding routing key. A signaling process can operate simultaneously in different TMTs as per served AS.

Signaling Gateways

This section provides an overview of possible SG/SGP functions, which to a large extent belong to a SUA layer and interwork with SCCP layer within SGP.

The SG provides for interworking of SS7 signaling endpoints with signaling nodes residing in an IP network.

Figure 11:
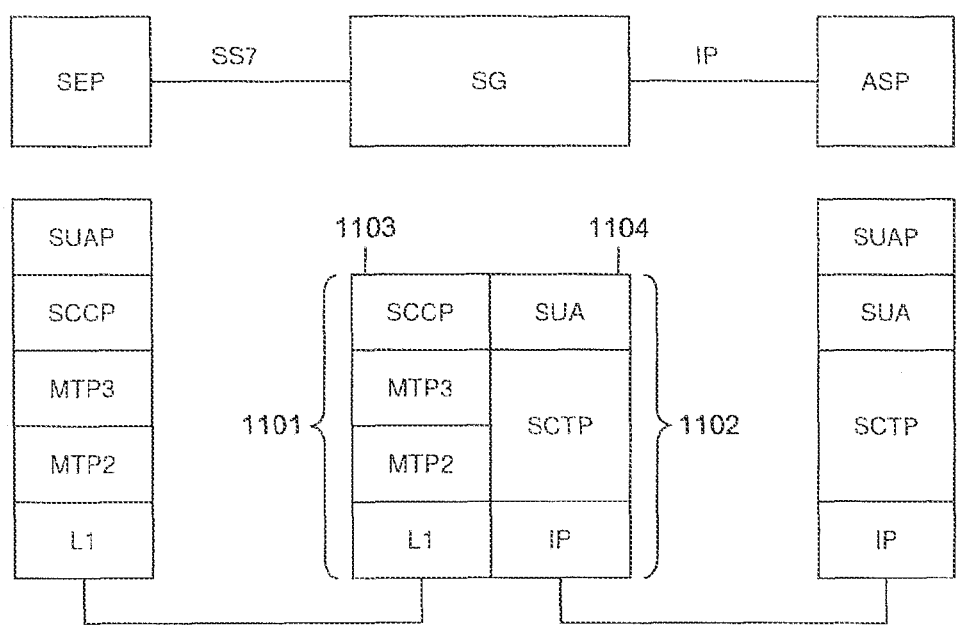
FIG. 11 is a schematic diagram illustrating a layer structure implemented at a signaling end point of the SS7 network, a signaling gateway and an application server of an IP-based network.

FIG. 11 shows a possible configuration of a SG, similar to the SG detailed on page 7 of RFC 3868.

The SG function is realized as one or more SGPs. Coordination between multiple SGPs is considered an implementation issue. The function of the SUA signaling gateway process comprises the SCCP layer functions and underlying SS7 stack 1101, and SUA layer functions and underlying SCTP/IP stack 1102.

The SUA and SCCP layers 1103 and 1104 within an SGP interwork for SCCP/SUA management and delivery of connection-oriented (CO) and connectionless (CL) SCCP-User messages. The border between the SCCP and SUA layers within an SGP is implementation dependent.

Figure 12:
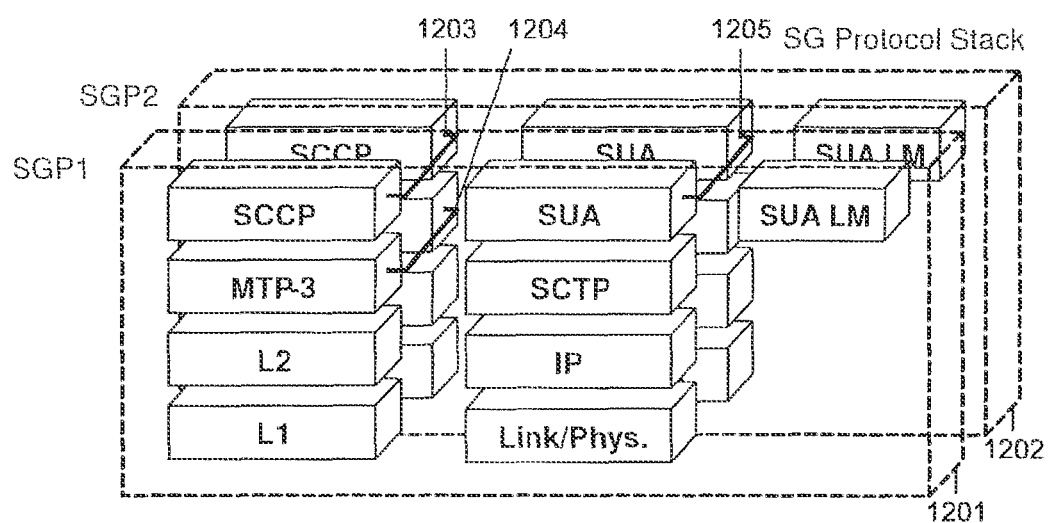
FIG. 12 is a schematic diagram illustrating the layer structure implemented at two signaling gateway processes serving a signaling gateway.

FIG. 12 shows an example of a SUA SG architecture consisting of two SGPs 1201 and 1202 each having its own SS7 and SIGTRAN protocol stacks, which are coordinated in a single NW management view towards SS7 and IP network elements via internal links 1203, 1204 and 1205 between corresponding layers of different SGPs. SUA layer management is shown as a functional entity separated from the SUA Layer itself. In other architectures SGPs can share SCCP layer and/or layers bellow, or SUA layer and/or layers below.

In addition to its standard SCCP Layer functions, the SGP may be able to decide based on a CdPA for any received SCCP-User message whether the message shall be routed to a SUA or to an SS7 peer. The CdPA may undergo modifications in a SCCP GTT.

On receiving a SCCP-User message, the SUA layer shall invoke the AMF and derive from the CdPA and CgPA, and possibly other parameters, a SCTP association, and forward the message to the next SUA hop. For this purpose the AMF in the SUA layer is automatically configured (using SUA RK management (RKM) procedures) or provisioned with its SUA peers, that is, remote signaling processes and their configuration, e.g. ASP identifiers, traffic ranges they are capable to serve (i.e. ASes), TMT, etc.

The support of RKM procedures is optional according to the SUA RFC.

The State management is a function associated with the AMF, and it may be considered as being part of the AMF. Possible state maintenance is described in section 4.3 of the RFC 3868. Further, SUA state machines for remote SUA entities may reside in the AMF within signaling processes (here SGPs).

The SUA layer at the SGP maintains the state of SUA layers per each remote ASP signaling process (Up, Down). The SUA layer at the SGP maintains the state of each (remote) AS per remote ASP signaling process (active, inactive). The SGP keeps an (aggregated) AS state of each remote AS (active, inactive, pending).

Traffic distribution to SUA peers is performed according to the current state of the concerned AS, traffic state of the AS in remote ASPs as well as associated load sharing labels. Traffic distribution is referred to as SUA messages distribution function in the RFC. It is part of the AMF.

The SGP is able to queue the SCCP-User messages for a certain period of time, when due to temporary failures or management actions the state of the concerned remote AS is pending.

There is a number of SUA procedures associated with states management. The procedures can be triggered in response to states changes or due to requests from SUA layer management and encompass an exchange of ASPSM, ASPTM and management messages with concerned signaling processes. For instance, when one remote ASP signaling process changes its state with respect to its capability of serving a traffic range, the SGP shall notify concerned remote signaling processes as described in section "4.3.4.5. Notify Procedures" of the RFC 3868.

The SUA layer at the SGP supports fail-over models for remote signaling processes (ASPs). It is based on the state maintenance of remote signaling processes and corresponding ASes.

When an SCCP-User message cannot be delivered to the next hop (or final) IP destinations due to their unavailability the SGP initiates the appropriate SCCP return or refusal procedures. The triggers for these procedures reside in an AMF of the SUA Layer.

It is assumed that SCCP-User messages coming from IP peers over SUA are always destined to an SS7 SEP. Therefore the messages can be delivered to the SCCP layer within a SGP without performing AMF in the SUA layer.

The SGP is able to populate a CgPA of the SCCP-User messages coming from IP based nodes based on the address indicator received from SUA ASPs, which may indicate their preferences about the wanted content of the CgPA.

SCCP and SUA layers cooperate in seizure and coupling of SCCP and SUA connection sections at connection setup, and use coupled records for routing of subsequent CO messages, see section A.3.2 in RFC 3868.

The RFC description of Interworking SCCP Network Management between SCCP and SUA is not exhaustive and targets primarily the SGP to ASP communication scenario. Interworking consists of sending destination unavailable (DUNA), destination available (DAVA), destination restricted (DRST), destination user part unavailable (DUPU) or signaling congestion (SCON) messages to the appropriate SUA peers when receiving subsystem prohibited (SSP), subsystem allowed (SSA), subsystem out-of-service-request (SOR), subsystem congested (SSC) (defined by SCCP), and in opposite direction sending SSP, SSA, SOR, SSC to the appropriate SS7 SEPs when receiving DUNA, DAVA, DRST, DUPU or SCON from a SUA peer. The latter scenario of SUA to SS7 interaction is poorly described; however, it can be inferred to some extent from the RFC text. In addition a DAUD message can be sent from SUA peers towards an SGP to audit the availability of SS7 destinations at SGP.

In section 1.4.4 the RFC 3868 suggests exchange of N-State, N-PCSTATE, and N-COORD primitives between the SCCP and SUA layers of an SGP to provide for interworking of SCCP management functions. The description in sections 1.4.4, 1.4.5, 4.1.1, and 4.5 follows the relation SCCP layer-SCCP-User on the management interface between SCCP layer and SUA layers. Although it is not stated explicitly, one can conclude that the interface is asymmetric, and for instance N-PCSTATE-Indication is not possible from SUA Layer to SCCP Layer. This interface needs to be enhanced for instance to support the SGP-SGP traffic case, where the N-PCSTATE-Indication can be sent to the SCCP layer.

Handling of MTP restart in SG is described in section 4.6 of the RFC. In case the SG undergoes an MTP restart it shall trigger DUNA messages to the concerned signaling processes, when the MTP restart procedure is completed the SG indicates that via DAVA messages to remote peers.

SCTP layer is able to detect congestions per association. SUA layer in SGP has an aggregated view of congestion situation based on notifications provided from SCTP layer and based on SCON messages received from SUA peers. When one or more remote signaling processes serving certain range of traffic experience congestion the SUA layer in SGP may trigger an indication of congestion towards SCCP layer, which on its turn distributes it further to remote SS7 SEPs as per congestion procedures of the relevant SCCP standard. The RFC considers triggering of SS7 SCCP management messages an implementation issue as far as congestion Management is concerned.

Mapping of messages to SCTP streams secures in sequence delivery of SCCP-User messages and SUA management messages when needed.

Error handling and event reporting to layer management are performed by SUA native management function in the SGP. In particular SUA version control belongs to SUA management function.

SUA layer management function enables operators to configure local and remote SUA entities, such as signaling processes and routing keys, and associated SUA functions. For instance it may be possible to block or unblock traffic of a certain range, or towards certain destinations.

To facilitate interworking between IP nodes and SS7 SEPs the SG can reassemble SCCP-User messages sent from SS7 NW and segment SCCP-User messages received from SUA peers.

Two SGs can have the same or different connectivity to the SS7 NW. In particular this means that SS7 nodes using only associated mode will be visible to SUA signaling Processes through one SG, unless there is a proprietary traffic tunneling link between SGs. The implementation of SG—SG communication is outside the scope of the SUA specification in RFC 3868.

The RFC does not clarify SUA SG functions, such as SCCP network management, for case where traffic is routed via multiple SGs (multiple SG case).

The SG and SGP have the vulnerability of losing IP connectivity when SS7 stack is up and running, and vice versa, it can lose SS7 connectivity when IP connectivity is available. A loss of connectivity may be due to faults in the hardware (HW)/software (SW) within the SG, NW infrastructure or misconfiguration. If these situations happen in multiple SG scenarios, there is a need for special handling of NW management.

When routing messages from a SG towards a SUA peer, two cases can be distinguished:
SG as SS7 endpoint, where the SCCP-User message is routed based on SPC and SSN
SG as SCCP relay, where the SCCP-User message is routed based on GT
SUA layer in SGP opens a listening socket, so that its communication peers can establish SCTP associations with the SGP.

Application Server Process

The ASP is an element of a distributed IP based signaling node. It is provisioned to receive certain ranges of signaling traffic, that is, serve particular ASes. Communication peers recognize the ASP either based on its SCTP endpoint, or ASP ID.

This section provides an overview of ASP functions, which to a large extent repeat functions belonging to a SUA layer in a SGP. The ASP is equipped with SUA functions depending on the ASP capabilities.

Figure 13:
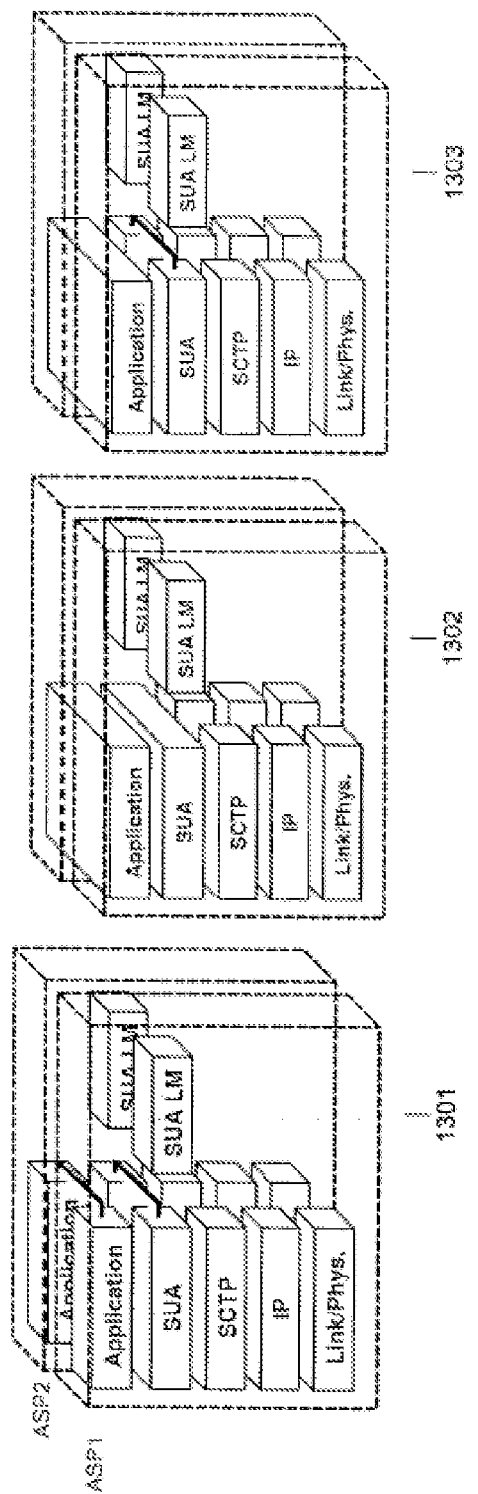
FIG. 13 is a schematic diagram illustrating three different examples of implementing a layer structure at two application server processes serving an application server.

All ASPs serving one routing key form an application server. The AS is a distributed entity and it is an implementation issue how its components are realized. As can be seen from the RFC 3868, an ASP can contain all protocol layers from physical layer to application layer. This is the example 1301 of FIG. 13, where the whole stack resides in one entity (i.e. signaling process). This and two other examples 1302 and 1303 of AS and ASPs architectures are given in FIG. 13, where, depending on the architecture, the application and SUA layers are the same or different entities per ASP. There are AS architectures which require coordination of states between ASPs as FIG. 12 shows. SUA layer management (SUA LM) is shown as a functional entity separated from the SUA layer itself.

In an exemplary set up and system architecture, SUA layers do not need to coordinate their states between ASPs. However, configuration data, such as TID and DRN labels, has to be consistent in ASPs serving a same AS.

The ASP SUA Layer supports transfer of SCCP-User messages to SUA peers on the path towards the destination application.

SUA layer holds local connection sections seized at connection setup and routes messages accordingly (sent to the SGP the connection belongs to).

The ASP initiates the establishment of the SCTP associations towards communication peers (SGPs).

The SUA layer at ASP initiates and terminates communication with remote SUA layers in SGPs (ASPs) via ASPSM messages. The SUA layer at the ASP keeps the state of the "remote adaptation layer" per each remote signaling processes (Up, Down, Up requested, Down requested).

The ASP maintains the state of each local AS (i.e. the AS served by the ASP). For example a local AS may be active, or inactive within the ASP, remotely blocked ("active"=the AS is in "active" state at least in one remote signaling processes, "inactive"=there is no remote signaling process where the AS is "active", etc.). For a n+k redundancy scheme, the state machine is different than for a 1+k scheme.

The ASP initiates activation and deactivation of local ASes towards remote SUA peers (SGPs) via ASPTM. The ASP maintains the states of local ASes per each remote signaling process (stable states: active, inactive; temporary states: activation requested, deactivation requested).

In an ASP—ASP scenario, the SUA layer, like SUA layer in SGP, keeps configuration data about remote ASPs and the remote ASes the remote ASPs are capable to serve. The ASP maintains the state of remote ASes per each remote ASP (active, inactive, and pending, locally blocked).

In the ASP—ASP scenario, like in a SGP, the SUA layer keeps the state of each remote AS (active, inactive, pending, and locally blocked) and uses it for routing purposes in the AMF. When the remote AS is not in an "active" state, the AMF invokes return or refusal procedures towards the local user in response to SCCP-User messages.

The AMF in the ASP implements a selection of a SCTP association towards the SUA SG based on addressing and sequence control parameters provided by SCCP-users. Then the ASP performs SCTP stream mapping using sequence control or similar information that relates to the message.

The SUA layer at the ASP may perform a segmentation of SCCP-User messages.

The SUA Layer management at an ASP drives ASP management procedures at command execution or automatically according to defined procedures.

The ASP can provide flow control based on congestion status of remote destinations and SCTP associations.

The ASP provides indications to local users (interworking of SCCP management messages) based on received SSNM messages from its SGs.

The ASP may send DAUD to query the availability state of the routes to an The ASP performs management of availability of destinations.

The ASP may implement congestion management and use SCON messages to indicate local congestions to SUA peers, and provide indications to local users about remote entities congestions due to local SCTP congestions (e.g. congestions of SCTP associations).

The SUA Layer at the ASP can support fail-over models for remote signaling processes (SGPs). It is based on the state maintenance of remote signaling processes and corresponding ASes.

ASPs serving the same AS may operate in one TMT. They can rely on NTFY messages or use internal communication to keep the AS in an active state, and activate the AS within the ASP when needed (e.g. when the AS is in state pending or there are insufficient resources to process AS traffic).

IP Server Process

The IPSP concept is similar to ASP. IPSPs host applications that communicate with other applications residing in IP realm. IPSPs use functions defined for ASPs and SGs, however they are not prepared to interwork SSNM messages.

The concept of an exchange model is defined for IPSP traffic management. The scenario of multiple SGs and related concepts do not apply to IPSP communication.

Relay Node

SUA relay may be defined as a functionality that determines the next hop SCTP association towards the destination SUA endpoint. A relay node may use destination addresses for this purpose.

The RFC 3868 mentions a relay node but leaves open the procedures and functions needed for a proper functionality of relay nodes. Various SUA relay interpretations can lead to interoperability problems. As an example, section 1.5.5 of the RFC does not specify a use of source addresses for routing purposes in a relay node.

A relay function in SUA was proposed in such an unspecified form in draft-ietf-sigtran-sua-05.txt published on 1 Feb. 2001 and developed in subsequent drafts; draft-ietf-sigtran-sua-16.txt issued on Dec. 11, 2003 has been approved as RFC 3868 in October 2004. Relay node support as ASP capability appears for the first time in draft-ietf-sigtran-sua-06.txt in June 2001.

The fact that SIGTRAN interfaces are asymmetric has never been considered for relay function. Therefore, suggested relay was never properly defined.

Communication Scenarios

Table 2 gives an overview of message classes and message types supported by SUA RFC 3868 per communication type. It shows messages that can be sent and received by particular types of SUA peers in specific communication scenarios. In particular this shows what kind of procedures the signaling processes have to support in order to fulfill the expectations of their peers depending on their type and capabilities.

TABLE 2

| Communication Type | Message Classes | Supported Message Types | Unsupported Message Types |
|---|---|---|---|
| 1. SGP to ASP | MGMT | ERR, NTFY | None |
| | SNM | DUNA, DAVA, SCON, DUPU, DRST | DAUD |
| | ASPSM | UP ACK, DOWN ACK, BEAT ACK, BEAT | UP, DOWN |
| | ASPTM | ACTIVE ACK, INACTIVE ACK | ACTIVE, INACTIVE |
| | RKM | REG RSP, DEREG RSP | REG REQ, DEREG REQ |
| | CL | CLDT, CLDR | None |
| | CO | CORE, COAK, COREF, RELRE, RELCO, RESCO, RESRE, CODT, CODA, COERR, COIT | None |
| 2. ASP to SGP | MGMT | ERR | NTFY |
| | SNM | SCON, DAUD, DRST | DUNA, DAVA, DUPU |
| | ASPSM | UP, DOWN, BEAT ACK, BEAT | UP ACK, DOWN ACK |
| | ASPTM | ACTIVE, INACTIVE | ACTIVE ACK, INACTIVE ACK |
| | RKM | REG REQ, DEREG REQ | REG RSP, DEREG RSP |
| | CL | as in SGP to ASP above | |
| | CO | as in SGP to ASP above | |
| 3. IPSP to IPSP | MGMT | all: ERR, NTFY | |
| | SNM | SCON | All except SCON |
| | ASPSM | all: UP, DOWN, UP ACK, DOWN ACK, BEAT ACK, BEAT | |
| | ASPTM | all: ACTIVE, INACTIVE, ACTIVE ACK, INACTIVE ACK | |
| | RKM | all: REG REQ, DEREG REQ, REG RSP, DEREG RSP | |
| | CL | as in SGP to ASP above | |
| | CO | as in SGP to ASP above | |

One can derive from this summary table that SUA interfaces are asymmetric as M3UA interfaces are, except for the case of IPSP—IPSP scenario.

The SUA relay function does not fit into these types of communication due to lack of corresponding NW management procedures.

Traffic Mode Types

For the loadsharing TMT a signaling process when sending traffic to its remote peer may use one of the message distribution mechanisms defined in the xxUA specifications, e.g. M3UA or SUA. It guaranties correct processing of application traffic and it does not depend on the architecture of the distributed peer node. Signaling processes of the same cluster may need to share some state information. SIGTRAN defines three TMTs: loadsharing, override, and broadcast.

Exchange Models

IPSP can use one of the two exchange models defined in SIGTRAN for ASP traffic management, single exchange (SE) and double exchange (DE).

SE is the exchange model preferably used, while DE is optional.

Further elements, processes and features disclosed in RFC 3868 and RFC 4666, which are incorporated herein by reference in their entirety, may be used in combination with embodiments of the present invention. It should be clear that embodiments of the invention may also be used in network environments different from the ones described in the referenced SIGTRAN standards.

As can be seen from the above description, a relay node according to an embodiment of the invention may enable a SIGTRAN interface conversion from one type to another. The relay node can enable applications at different SIGTRAN nodes having incompatible interfaces to communicate with each other. Plural of such relay nodes enable a hierarchical SIGTRAN network architecture which allows a separation of SIGTRAN networks into independent sub-networks. Thus, each sub-network can be configured independently, while relay nodes bridge these sub-networks and perform a necessary interworking of network management and traffic management procedures. The relay node allows hiding of parts of a SIGTRAN network configuration, for instance existing signaling processes, application servers, their capabilities, traffic modes, redundancy schemes etc., while providing for a communication of nodes with different SIGTRAN capabilities. The relay nodes can host policing, accounting, screening and other centralized functions, which otherwise have to be placed in each SIGTRAN endpoint. The latter is frequently not possible and cost intensive. The relay nodes enable a centralization of functions in a few centralized redundant relay nodes, which may be geographically distributed. This can reduce operational expenditure.

While specific embodiments of the invention are disclosed herein, various changes and modifications can be made without departing from the spirit and the scope of the invention.

The present embodiments are to be considered in all respect as illustrated and non-restrictive, and all changes coming within the meaning and equivalence range of the appended claims are intended to be embraced therein.

ABBREVIATIONS

AMF Address Mapping Function
AS Application Server
ASP Application Server Process
ASP SM ASP State Management
ASP TM ASP Traffic Management
ASP*M ASP SM and ASP TM
CN Core Network
CdA Called Address
CdPA Called Party Address
CgA Calling Address
CgPA Calling Party Address
DE Double Exchange
DPC Destination Point Code
DRN Destination Reference Number
DTID Destination TID
GT Global Title
GTT GT Translation
IPSP IP Server Process
LSS Local SSN
LSSN Local SSN
LRN Local Reference Number
MSC-S MSC Server
MSC-S-BC MSC Server based on Blade Cluster Architecture
NA Network Appearance
NI Network Indicator
NE Network Element
OWNSP Own SPC
OTID Originating TID
RAN Radio Network
RC Routing Context
RK Routing Key
RL Routing Label
SE Single Exchange
SEP SS7 Signaling Endpoint
SG Signaling Gateway
SGP Signaling Gateway Process
SI Service Indicator
SIO Service Information Octet
SN Service Network
SNM SCCP Network Management
SP Signaling Process
SPC Signaling Point Code
SPMC Signaling Point Management Cluster
SRP SCCP Relay Point
SSA SSN Allowed
SSN Subsystem Number
SSNM SS7 Signaling Network Management
SSP SSN Prohibited
SUA SCCP User Adaptation
TFA Transfer Allowed
TFP Transfer Prohibited
TID Transaction Identity
WG Working Group
xxUA SIGTRAN User Adaptation layer, such as M3UA, or SUA

The invention claimed is:

1. A network node for routing messages in an IP based signaling network, comprising:
a processor and a memory, the memory containing instructions executable by the processor whereby the network node is configured to:
implement at least two interfaces each towards a remote network node of the IP based signaling network, each remote network node implementing a remote signaling process; and
route an incoming message received at a first of the at least two interfaces to a second interface of the at least two interfaces, the routing comprising a translating of the incoming message into a corresponding outgoing message in dependence on a type of the remote signaling process of the remote network node at the first interface and a type of the remote signaling process of the remote network node at the second interface.

2. The network node according to claim 1, wherein the memory contains instructions executable by the processor whereby the network node is configured to determine the type of the remote signaling process of the remote network node at the second interface based on address-related parameters comprised in the incoming message.

3. The network node according to claim 1, wherein the at least two interfaces comprise an interface towards a remote network node implementing an application server process, an interface towards a remote network node implementing a signaling gateway process and an interface towards a remote network node implementing an internet protocol server process.

4. The network node according to claim 1, wherein each of the at least two interfaces is provided by a local signaling process running locally on said processing unit, and wherein a type of the local signaling process is determined by the type of the remote signaling process of the remote network node at the interface provided by the local signaling process.

5. The network node according to claim 4, wherein the at least two interfaces comprise an interface towards a remote network node implementing an application server process, an interface towards a remote network node implementing a signaling gateway process and an interface towards a remote network node implementing an internet protocol server process, wherein the interface towards the remote network node implementing an application server process is provided by a local signaling gateway process, the interface towards a remote network node implementing an signaling gateway process is provided by a local application server process, and the interface towards a remote network node implementing an internet protocol server process is provided by a local internet protocol server process.

6. The network node according to claim 4, further comprising a memory to store a state of at least one remote network node at one of the at least two interfaces, and wherein the local signaling process providing the respective interface is configured to update the stored state in accordance with the status of the remote network node.

7. The network node according to claim 1, wherein the memory contains instructions executable by the processor whereby the network node is configured to implement an IP based protocol stack comprising a user adaptation layer, said at least two interfaces being provided at said user adaptation layer.

8. The network node according to claim 7, wherein the memory contains instructions executable by the processor whereby the network node is configured to perform the translation by a function implemented at said user adaptation layer.

9. The network node according to claim 7, wherein the user adaptation layer is a signaling connection control part user adaptation layer or a message transfer part 3 user adaptation layer.

10. The network node according to claim 1, wherein the memory contains instructions executable by the processor whereby the network node is configured to implement an IP based protocol stack comprising a stream control transmission protocol layer configured to establish a stream control transmission protocol association for each of the at least two interfaces towards the remote network node at the respective interface by using a single stream control transmission protocol endpoint for all stream control transmission protocol associations or by using a dedicated stream control transmission protocol end point for each remote signaling process of the remote network nodes at the at least two interfaces.

11. The network node according to claim 1, wherein the memory contains instructions executable by the processor whereby the network node is configured to perform the translation so that it comprises modifying at least one of
a message parameter value,
a message parameter set,
an information element value,
an information element set, or
at least one parameter selected from a group comprising
a network appearance,
a routing context,
a message type,
a message class,
a protocol version, and
a message length,
so as to bring the outgoing message into accordance with the type of remote signaling process of the remote network node at the second interface.

12. A method of routing messages in an IP based signaling network using a network node comprising at least two interfaces each towards a remote network node of the IP based signaling network, each remote network node implementing a remote signaling process, the method comprising routing an incoming message received at a first of the at least two interfaces to a second interface of the at least two interfaces, the routing comprising translating the incoming message into a corresponding outgoing message in dependence on a type of the remote signaling process of the remote network node at the first interface and a type of the remote signaling process of the remote network node at the second interface.

13. The method according to claim 12, further comprising:
determining the type of the remote signaling process of the remote network node at the second interface based on address-related parameters comprised in the incoming message.

14. The method according to claim 12, wherein the network node implements an IP based protocol stack comprising a user adaptation layer, and wherein the routing is performed by receiving the incoming message and sending the outgoing message using the same user adaptation protocol layer.

15. The method according to claim 12, further comprising running locally at least two local signaling processes on the relay node, each local signaling process providing at least one of the at least two interfaces, wherein a type of the local signaling process is determined by the type of the remote signaling process of the remote network node at the interface provided by the local signaling process.

16. The method according to claim 12, wherein the translation comprises modifying at least one of
a message parameter value,
a message parameter set,
an information element value,
an information element set, or
at least one parameter selected from a group comprising
a network appearance,
a routing context,
a message type,
a message class,
a protocol version, and
a message length,
so as to bring the outgoing message into accordance with the type of remote signaling process of the remote network node at the second interface.

17. The method according to claim 12, wherein the type of remote signaling process of the remote network node at one of the at least two interfaces determines message types allowed to be sent via the interface, and wherein the translating includes a modifying of a message type of the incoming message so that a message type of the outgoing message corresponds to a message type allowed to be sent via the second interface.

18. The method according to claim 12, wherein the translating includes a transcribing of a routing context by:
identifying an incoming routing key associated with the incoming message based on a routing context parameter comprised in the incoming message;
determining an outgoing routing key for said outgoing message on the basis of the incoming routing key or on the basis of the incoming routing key in combination with address-related parameters comprised in the incoming message; and
assigning a routing context corresponding to the outgoing routing key to the outgoing message.

19. The method according to claim 12, further comprising storing a state of a remote network node associated with one of said at least two interfaces and/or storing a state of a remote SS7 network node available via a signaling gateway associated with one of said at least two interfaces.

20. The method according to claim 19, further comprising:
changing the state stored for a particular remote network node in accordance with a received network management message or a received traffic maintenance message; and
providing information to a remote signaling process on a change of a stored state by sending a network management message or a traffic maintenance message to the remote signaling process via one of the at least two interfaces, wherein a type of network management message or a type of traffic maintenance message sent is determined by the type of the remote signaling process towards which the respective message is sent.

21. The method according to claim 12, wherein the translating comprises a network address conversion between a SS7 signaling network specific identifier and an internet protocol specific identifier, and/or between different SS7 network specific numbering plans.

22. The method according to claim 12, wherein, in case the remote signaling process of the remote network node at the first interface implements a first version of a user adaptation protocol different from a second version of the user adaptation protocol implemented by the remote signaling process of the remote network node at the second interface, the translating comprises a removing and/or replacing of a parameter of the incoming message so as to bring the outgoing message into accordance with the second user adaptation protocol version.

23. A relay network using an IP based user adaptation protocol for relaying signaling messages comprising plural network nodes as relay nodes, each network node being configured to route messages in an IP based signaling network and comprising:
a processor and a memory, the memory containing instructions executable by the processor whereby the network node is configured to:
implement at least two interfaces each towards a remote network node of the IP based signaling network, each remote network node implementing a remote signaling process; and
route an incoming message received at a first of the at least two interfaces to a second interface of the at least two interfaces, the routing comprising a translating of the incoming message into a corresponding outgoing message in dependence on a type of the remote signaling process of the remote network node at the first interface and a type of the remote signaling process of the remote network node at the second interface.

24. The relay network according to claim 23, wherein a relay node of the relay network is configured to detect another relay node of the relay network and to adapt its configuration to a configuration of the other relay node.

25. The relay network according to claim 23, wherein at least one relay node implements an operation and maintenance application in order to detect routing problems including at least circular routing in the relay network.

26. A computer program product stored on a non-transitory computer readable medium and comprising electronically readable control information configured such that, when the control information is executed on a computer system, the control information routes messages in an IP based signaling network using a network node that comprises at least two interfaces each towards a remote network node of the IP based signaling network, each remote network node implementing a remote signaling process, the control information routing messages by routing an incoming message received at a first of the at least two interfaces to a second interface of the at least two interfaces, the routing comprising translating the incoming message into a corresponding outgoing message in dependence on a type of the remote signaling process of the remote network node at the first interface and a type of the remote signaling process of the remote network node at the second interface.

27. The method of claim 12, wherein the IP based signaling network is a SIGTRAN network, wherein said at least two interfaces are different types of SIGTRAN interfaces, and the remote signaling processes are different types of SIGTRAN signaling processes.

28. The method of claim 12, wherein each remote signaling process owns an SCTP (Stream Control Transmission Protocol) endpoint, and wherein messages communicated over the at least two interfaces are transported using SCTP associations towards the remote network nodes.

29. The method of claim 12, wherein the network node implements an IP based protocol stack comprising a user adaptation layer, said at least two interfaces being provided at said user adaptation layer.

30. The method of claim 12, wherein the at least two interfaces comprise an interface towards a remote network node implementing an application server process, an interface towards a remote network node implementing a signaling gateway process and an interface towards a remote network node implementing an internet protocol server process.

31. The network node according to claim 1, wherein the IP based signaling network is a SIGTRAN network, wherein said at least two interfaces are different types of SIGTRAN interfaces, and the remote signaling processes are different types of SIGTRAN signaling processes.

32. The network node according to claim 1, wherein each remote signaling process owns an SCTP (Stream Control Transmission Protocol) endpoint, and wherein messages communicated over the at least two interfaces are transported using SCTP associations towards the remote network nodes.

33. The network node according to claim 1, wherein the network node implements an IP based protocol stack comprising a user adaptation layer, said at least two interfaces being provided at said user adaptation layer.

34. The network node according to claim 1, wherein the at least two interfaces comprise an interface towards a remote network node implementing an application server process, an interface towards a remote network node implementing a signaling gateway process and an interface towards a remote network node implementing an internet protocol server process.

\* \* \* \* \*